(12) United States Patent
Danivas et al.

(10) Patent No.: US 12,388,757 B2
(45) Date of Patent: Aug. 12, 2025

(54) SYSTEMS AND METHODS FOR USING PROGRAMMABLE POLICER CIRCUITS FOR NETWORK FLOW POLICING

(71) Applicant: Advanced Micro Devices, Inc., Santa Clara, CA (US)

(72) Inventors: Vishwas Danivas, Santa Clara, CA (US); Kit Chiu Chu, Fremont, CA (US); Murty Kotha, San Jose, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 50 days.

(21) Appl. No.: 18/397,862

(22) Filed: Dec. 27, 2023

(65) Prior Publication Data

US 2025/0219948 A1 Jul. 3, 2025

(51) Int. Cl.
*H04L 47/20* (2022.01)
*H04L 47/215* (2022.01)
*H04L 47/32* (2022.01)

(52) U.S. Cl.
CPC ............ *H04L 47/20* (2013.01); *H04L 47/215* (2013.01); *H04L 47/32* (2013.01)

(58) Field of Classification Search
CPC ........ H04L 47/20; H04L 47/215; H04L 47/32
See application file for complete search history.

(56) References Cited

U.S. PATENT DOCUMENTS

| | | | |
|---|---|---|---|
| 9,698,791 B2 | 7/2017 | Vassiliev | |
| 9,871,733 B2 | 1/2018 | Atluri et al. | |
| 11,516,135 B2 | 11/2022 | Aibester et al. | |
| 2016/0248686 A1* | 8/2016 | Lee | H04W 4/24 |
| 2018/0234297 A1* | 8/2018 | Wang | H04L 41/0893 |
| 2022/0052936 A1* | 2/2022 | Chandrasekaran | H04L 41/40 |
| 2023/0064845 A1* | 3/2023 | Srinivasan | H04L 43/10 |
| 2023/0224217 A1* | 7/2023 | Subrahmanya | H04L 41/082 370/254 |
| 2024/0163230 A1* | 5/2024 | Danivas | H04L 49/3063 |

* cited by examiner

*Primary Examiner* — Benjamin M Thieu

(57) ABSTRACT

The packet processing chip of a networking device includes a packet processing pipeline circuit and a programmable policer circuit. A single programmable policer circuit may use policing policy identifiers and an aggregated token bucket to police multiple network flows. A policing policy identifier may govern which policing policy is used for a network packet. Each network flow may have a flow table entry that includes a policing policy identifier and a programmable policer circuit identifier. After reading the flow table entry for processing a network packet, the packet processing pipeline circuit may send data including the policing policy identifier to the programmable policer circuit which returns a policing decision in accordance with the policing policy and the state of the aggregated token bucket. Different network flows may use the same aggregated token buck and different policing policies to thereby implement strict priority of some network flows over others.

20 Claims, 17 Drawing Sheets

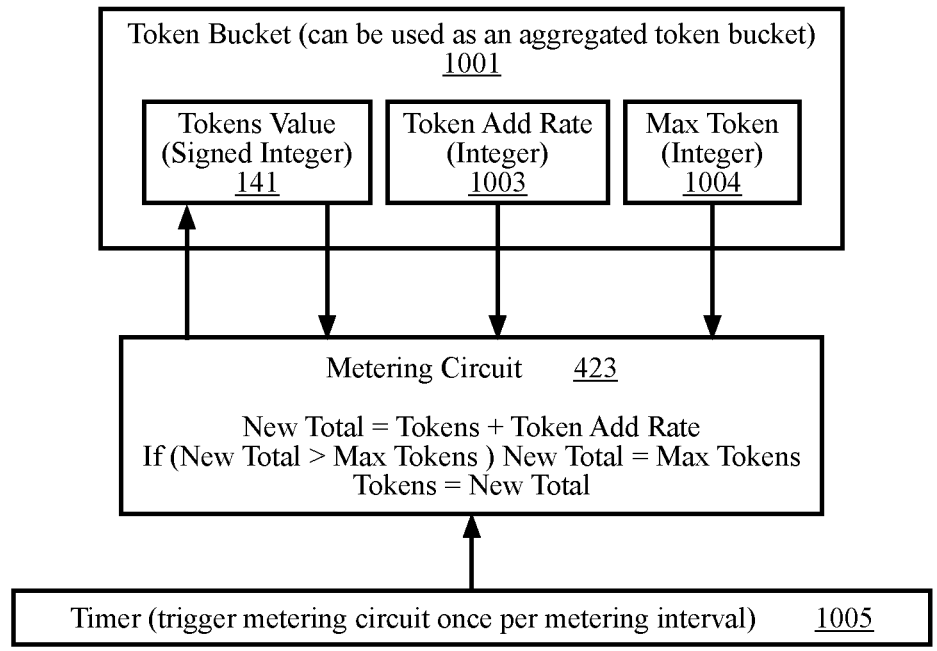

FIG. 10

| Policer Policy Table 1101 ||
|---|---|
| Policing Policy Identifier 1102 | Policing Policy (may be executable code for producing policing decision) 1103 |
| Policing Policy ID = 0 | Drop when allowing the packet would cause the tokens value to be less than a threshold value (e.g., 0), otherwise allow and decrease the tokens value. |
| Policing Policy ID = 1 | Always allow and always decrease the tokens value based on the resources required value (e.g., packet size) in the policing data. This policy would allow the packet even though allowing the packet would cause the tokens value to be less than a threshold value (e.g., 0). |
| Policing Policy ID = 2 | Always allow without decreasing the tokens value. This policy would allow the packet even though the tokens values is below a threshold value (e.g., 0). |

FIG. 11

SYSTEMS AND METHODS FOR USING PROGRAMMABLE POLICER CIRCUITS FOR NETWORK FLOW POLICING

TECHNICAL FIELD

The systems and methods relate to computer networks, local area networks, networking devices that may be a router, a switch, a network interface card (NIC), a smartNIC, a distributed service card (DSC), etc. The systems and methods also relate to elements of networking devices such as semiconductor chips implementing packet processing pipeline circuits, programmable policer circuits, and aggregated token buckets.

BACKGROUND

Networking devices process network flows by receiving network packets and processing the network packets. The network packets are often processed by examining the packet's header data and applying networking policies such as routing policies, firewall policies, load balancing policies, etc. Packet processing may be performed by a packet processing pipeline such as a "P4" packet processing pipeline. The concept of a domain-specific language for programming protocol-independent packet processors, known simply as "P4," developed to provide some flexibility at the data plane of a networking device. The P4 domain-specific language for programming the data plane of networking devices has been defined in the "P4$_{16}$ Language Specification," published by the P4 Language Consortium. P4 (also referred to herein as the "P4 specification," the "P4 language," and the "P4 program") may be implemented on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata. Packet processing pipeline circuits may be central processing unit (CPU) offloads that offload work from the CPUs and thereby free the CPUs to perform other tasks. Cryptographic transform circuits, compression circuits, and decompression circuits, are also examples of CPU offloads.

BRIEF SUMMARY OF SOME EXAMPLES

The following presents a summary of one or more aspects of the present disclosure, to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure may be implemented in a system. The system may include a programmable policer circuit configured to use a token bucket and a policing policy to produce a policing decision for a network packet in a network flow associated with the policing policy, a packet processing pipeline circuit configured to implement a data plane, and a processor configured to implement a control plane, wherein the programmable policer circuit, the packet processing pipeline circuit, and the processor are further configured to implement network flow policing that involves the control plane configuring the data plane to process the network packet, and the control plane associating the network flow with the policing policy such that the data plane is configured to process the network packet in accordance with the policing decision.

Another aspect of the subject matter described in this disclosure may be implemented by a method. The method may include using a network packet to identify a programmable policer circuit and a policing policy for a network flow that includes the network packet, and obtaining a policing decision for the network packet from the programmable policer circuit, the policing decision in accordance with the policing policy. The method may also include processing, by a packet processing pipeline circuit, the network packet in accordance with the policing decision.

Yet another aspect of the subject matter described in this disclosure may be implemented in a system. The system may include a programmable policing means for producing a policing decision for a network packet in accordance with a tokens value and a policing policy for a network flow, and a packet processing means for processing the network packet in accordance with the policing decision, wherein the programmable policing means produces a second policing decision for a second network packet in accordance with the tokens value and a second policing policy for a second network flow, and the packet processing means processes the second network packet in accordance with the second policing decision.

In some implementations of the methods and devices, the packet processing pipeline circuit is configured to use the network packet to identify a flow table entry that includes a policing policy identifier identifying the policing policy and a policer identifier identifying the programmable policer circuit, and the packet processing pipeline circuit uses the policer identifier to provide policing data to the programmable policer circuit, the policing data including the policing policy identifier. In some implementations of the methods and devices, the control plane uses a plurality of networking policies to produce a plurality of flow table entries that includes the flow table entry. In some implementations of the methods and devices, the token bucket is an aggregated token bucket, the programmable policer circuit is configured to use the aggregated token bucket and a second policing policy to produce a second policing decision for a second network packet in a second network flow associated with the second policing policy, and the packet processing pipeline circuit is configured to process the second network packet in accordance with the second policing decision. In some implementations of the methods and devices, the network flow is directed to or from a network endpoint and the second network flow is directed to or from the network endpoint. In some implementations of the methods and devices, wherein the network endpoint is a virtual machine.

In some implementations of the methods and devices, the packet processing pipeline circuit includes a parser stage and a plurality of match-action processing stages, the parser stage produces a packet header vector (PHV) from the network packet, and one of the match-action processing stages uses the PHV to identify the flow table entry. In some implementations of the methods and devices, the policing decision is to drop the network packet in response to determining that allowing the network packet would cause a tokens value of the aggregated token bucket to be less than a threshold value, and the second policing decision is to allow the second network packet even though the tokens value is below the threshold value. In some implementations of the methods and devices, the network flow is a non-storage flow, and the second network flow is a storage flow. In some implementations of the methods and devices, the policing decision is to drop the network packet in response to determining that allowing the network packet would cause a tokens value of the aggregated token bucket to be less than a threshold value, and the second policing policy is to always allow and to always decrease the tokens value based on a size of an allowed network packet.

In some implementations of the methods and devices, a flow table includes a flow table entry that is associated with first network flow, the packet processing pipeline circuit uses the network packet to identify the flow table entry, the flow table entry includes a policing policy identifier that identifies the policing policy and includes a policer identifier that identifies the programmable policer circuit, and the packet processing pipeline circuit uses the policer identifier and the policing policy identifier to obtain the policing decision from the programmable policer circuit. In some implementations of the methods and devices, the method further includes using a plurality of networking policies to produce a plurality of flow table entries that includes the flow table entry. In some implementations of the methods and devices, the method further includes using a tokens value in an aggregated token bucket for policing the network flow and a second network flow that is associated with a second policing policy, using, by the programmable policer circuit, the aggregated token bucket and the second policing policy to produce a second policing decision for a second network packet that is in the second network flow, and processing, by the packet processing pipeline circuit, the second network packet in accordance with the second policing decision.

In some implementations of the methods and devices, the system further includes a lookup means for using the network packet to identify the programmable policing means and the policing policy, wherein the lookup means uses the second network packet to identify the programmable policing means and the second policing policy.

These and other aspects will become more fully understood upon a review of the detailed description, which follows. Other aspects and features will become apparent to those of ordinary skill in the art, upon reviewing the following description of specific examples in conjunction with the accompanying figures. While features may be discussed relative to certain examples and figures below, any example may include one or more of the advantageous features discussed herein. In other words, while one or more examples may be discussed as having certain advantageous features, one or more of such features may also be used in accordance with the various examples discussed herein. In similar fashion, while the examples may be discussed below as devices, systems, or methods, the examples may be implemented in various devices, systems, and methods.

BRIEF DESCRIPTION OF THE DRAWINGS

FIG. 10 is a high-level conceptual diagram illustrating a metering circuit refilling the tokens in a token bucket that may be used as an aggregated token bucket, according to some aspects.

FIG. 11 is a high-level conceptual diagram illustrating policing policy identifiers that are associated with policing policies, according to some aspects.

Throughout the description, similar reference numbers may be used to identify similar elements.

DETAILED DESCRIPTION

Figure 1:
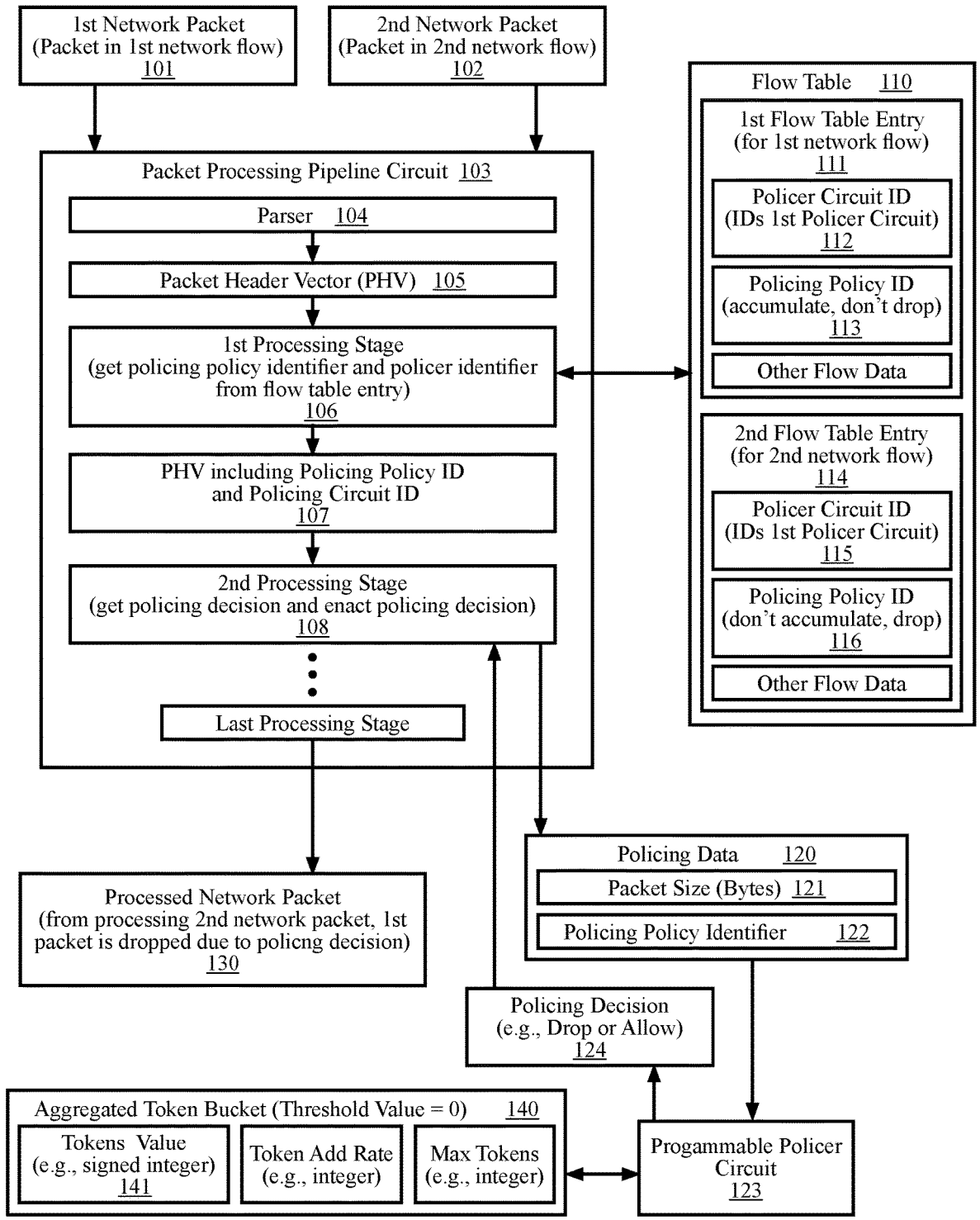
FIG. 1 is a high-level conceptual diagram illustrating a system using programmable policer circuits to implement strict priority for a class of traffic, according to some aspects.

It will be readily understood that the components of the examples as generally described herein and illustrated in the appended figures could be arranged and designed in a wide variety of different configurations. Thus, the following more detailed description of various examples, as represented in the figures, is not intended to limit the scope of the present disclosure but is merely representative of various examples. While the various aspects of the examples are presented in drawings, the drawings are not necessarily drawn to scale unless specifically indicated.

Systems and methods that implement aspects may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one example. Thus, discussions of the features and advantages, and similar language, throughout this specification may, but do not necessarily, refer to the same example.

Furthermore, the described features, advantages, characteristics, and aspects may be combined in any suitable manner in one or more systems or methods. One skilled in the relevant art will recognize, in light of the description herein, that one example may be practiced without one or more of the specific features or advantages of another example. In other instances, additional features and advantages may be recognized in one example that may not be present in all the examples.

Reference throughout this specification to "one example", "an example", or similar language means that a particular feature, structure, or characteristic described in connection with the indicated example is included in at least one example. Thus, the phrases "in one example", "in an example", and similar language throughout this specification may, but do not necessarily, all refer to the same example.

In the field of data networking, the functionality of networking devices such as switches, routers, and NICs are often described in terms of functionality that may be associated with a "control plane" and functionality that may be associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein may use a match-action pipeline in the data plane to process packets. A match-action pipeline may process network flows extremely quickly when configured to process those network flows. A match-action pipeline has a series of match-action stages. Upon receiving a packet of a network flow, the first match-action stage of a match-action pipeline may generate an index from data in the packet header. Finding a flow table entry for the network flow at the index location in the flow table is the "match" portion of "match-action". If there is a "match", the "action" is performed to thereby process the packet. If there is no flow table entry for the network flow, it is a new network flow that the match-action pipeline is not yet configured to process. If there is no match, then the match-action stage may perform a default action. Match-action stages may pass the packet to a subsequent match-action stage in the match-action pipeline.

The high-volume and rapid decision-making that occurs at the data plane is often implemented in one or more semiconductor chips. An application specific integrated circuit (ASIC) and a field programmable gate array (FPGA) are examples of such semiconductor chips. A semiconductor chip such as a fixed function ASIC may enable high-volume and rapid packet processing. However, a fixed function ASIC typically does not provide enough flexibility to adapt to changing needs. Data plane processing implemented in FPGAs may provide a high level of flexibility in data plane processing.

Data centers run workloads for a variety of tenants. The workloads may include one or more virtual machine (VM) running on a host computer provisioned by the data center. An aspect of hosting those workloads is meeting quality of service (QoS) guarantees. Another aspect is limiting tenants to the level of resources they have contracted for. For example, a first tenant that has contracted for 1 GB/s of bandwidth may attempt to consume 10 GB/s of bandwidth. A second tenant that has contracted for 10 GB/s of bandwidth may get less than that bandwidth when the first tenant is allowed to consume too much of the available bandwidth. As such, communications for some workloads are throttled so that others may receive their allotment of network services. The communications for a workload may be throttled by a NIC installed in the host running the workload. The NIC may include policer circuits that may track the resource consumption (e.g., network bandwidth, packets per second, etc.) of the network flows and may produce a policing decision to drop a network packet in response to determining that a network flow will exceed its allocation of resources. Different types of network flows (e.g., storage flows and non-storage flows) may be policed differently. A storage flow is a network flow between two network endpoints where one of the endpoints is providing storage (e.g., network attached storage devices. storage area networks, etc.). Network flows that are not storage flows are non-storage flows. For example, a network flow between a web server and a user device may be a non-storage flow. A policer circuit, unlike the programmable policer circuits discussed herein, implements a single policing policy such as "drop all packets that would result in a threshold usage being exceeded".

In some cases, the number of policer circuits may limit the number of network flows that may be concurrently policed or the total network resource consumption of a tenant or workload may be policed instead of policing the flows individually. A policer circuit may implement a single policing policy whereas different policing policies based on aggregated network resource consumption may be needed for different types of network flows.

In some examples, a tenant's or workload's aggregated network resource consumption may be policed with a programmable policer circuit, a token bucket, and a packet processing pipeline circuit. An aspect of the programmable policer circuit is that it may implement different policing policies for different network flows. A token bucket shared by multiple network flows may be referred to as an aggregated token bucket and may be used for policing a tenant's or workload's aggregated network resource consumption. A networking device (e.g., a SmartNIC) may include a data plane implemented by a packet processing pipeline circuit (e.g., a P4 pipeline circuit) and a control plane implemented by one or more general purpose processors (e.g., an x86 or ARM CPUs). The control plane may configure the data plane to process the network packets of network flows and may associate different network flows with different policing policies. The control plane may also associate one of the networking device's programmable policer circuits with a group of network flows that have different policing policies. An aggregated token bucket may be used to track the resource consumption of all the network flows associated with one programmable policer circuit. The programmable policer circuit may check the aggregated token bucket and produce a policing decision for a network packet by implementing the policing policy associated with the network flow that includes the network packet. The packet processing pipeline circuit may act on the policing decisions by dropping or not dropping network packets.

One advantage over a non-programmable policer circuit is that a programmable policer circuit may, while using a single aggregated token bucket, produce different policing decisions for network packets in different network flows. Another advantage is that a programmable policer circuit may implement strict priority for a class of traffic (e.g., storage flows) by allowing that class of traffic when a different class of traffic (e.g., non-storage flows) is dropped. Yet another advantage is that a single programmable policer circuit may be used for a workload's different classes of network traffic, thereby conserving the number of policer circuits that are used. Still yet another advantage is that different network flows may be policed using different policing policies, which may improve the performance of the workloads. For example, the execution of a workload may be paused while the workload is waiting for a storage packet but the workload's execution may be more resilient with respect to non-storage network flows. A more specific example is a workload such as a web server that does not wait for responses to outgoing packets HTTP packets but pauses while waiting for a response to a read request sent to a storage area network (SAN).

FIG. 1 is a high-level conceptual diagram illustrating a system using programmable policer circuits to implement strict priority for a class of traffic, according to some aspects. Two network packets are received. The first network packet 101 is in a first network flow. The second network packet 102 is in a second network flow. A packet processing pipeline circuit 103 may process the network packets. A parser 104 produces a packet header vector (PHV) 105 from a network packet. A first processing stage 106, which may also be referred to as the first match-action stage, may use the PHV to look up the flow table entry for a network packet. The flow table 110 includes a first flow table entry 111 for the first network flow and includes a second flow table entry 114 for the second network flow. As such, the first processing stage uses the first flow table entry 111 for processing the first network packet 101 and uses the second flow table entry 114 for processing the second network packet 102. A flow table entry may include a field for a policer circuit identifier and a field for a policing policy identifier. The policer circuit identifier 112 of the first flow table entry 111 identifies a programmable policer circuit 123 that is one of the programmable policer circuits. The policer circuit identifier 115 of the second flow table entry 114 also identifies the programmable policer circuit 123. As such, the same programmable policer circuit 123 is used for the first network packet 101 and for the second network packet 102 even though the network packets are in different network flows. The packet processing pipeline circuit 103 and the programmable policer circuit may be implemented in a semiconductor chip such as the semiconductor chip 401 illustrated in FIG. 4.

The policing policy identifier 113 of the first flow table entry 111 identifies an "accumulate, don't drop" policing policy. The policing policy identifier 116 of the second flow table entry 114 identifies a "don't accumulate, drop" policing policy. The policing policy identifier 116 of the second flow table entry 114 also identifies the programmable policer circuit 123. As such, the programmable policer circuit 123 will implement one policing policy for the first network packet 101 and will implement a different policing policy for the second network packet 102. The first processing stage 106 may add the policing policy identifier and the policer circuit identifier to the PHV 107, which is passed to the next stage of the packet processing pipeline circuit 103. The second processing stage 108, which may also be called the second match-action stage, receives the PHV and sends policing data 120 to the programmable policer circuit identified by the policer circuit identifier in the flow table entry. The policing data 120 may include the packet size 121 and the policing policy identifier 122 from the flow table entry. The packet size 121 is a resources required value. A resources required value indicates the amount of resources that would be required for processing a network packet. The programmable policer circuit 123 uses an aggregated token bucket 140 to track the amount of network resources consumed. For example, packet size 121 may be used to ensure that bandwidth limits are respected. The tokens value 141 in the aggregated token bucket indicates an amount of network resources that are available for the network flows. The programmable policer circuit 123 may use the tokens value 141 and the packet size 121 to produce a policing decision 124. The second processing stage 108 may implement the policing decision by dropping the network packet if the policing decision 124 is "drop" or by continuing to process the network packet if the policing decision 124 is "allow". When the policing decision for a network packet is "allow", the network packet is an allowed network packet. A processed network packet 130 may be the result when the packet processing pipeline continues processing the network packet. In some implementations, the first processing stage 106 may read the flow table entry, send the policing data to the programmable policer circuit, and implement the policing decision.

The aggregated token bucket 140 illustrated in FIG. 1 may have a threshold value that equals 0. The programmable policer circuit may compare the difference of the tokens value and the packet size (e.g., tokens value minus packet size) to the threshold value and make the policing decision based on the result of the comparison. The threshold value may be implicit. For example, the threshold may be assumed to be zero. Alternatively, a threshold value may be associated with or stored in the aggregated token bucket or the programmable policer circuit. The flow table entries may include a threshold value that may then be included in the policing data and then used by the policer circuit to make the policing decision.

Figure 2:
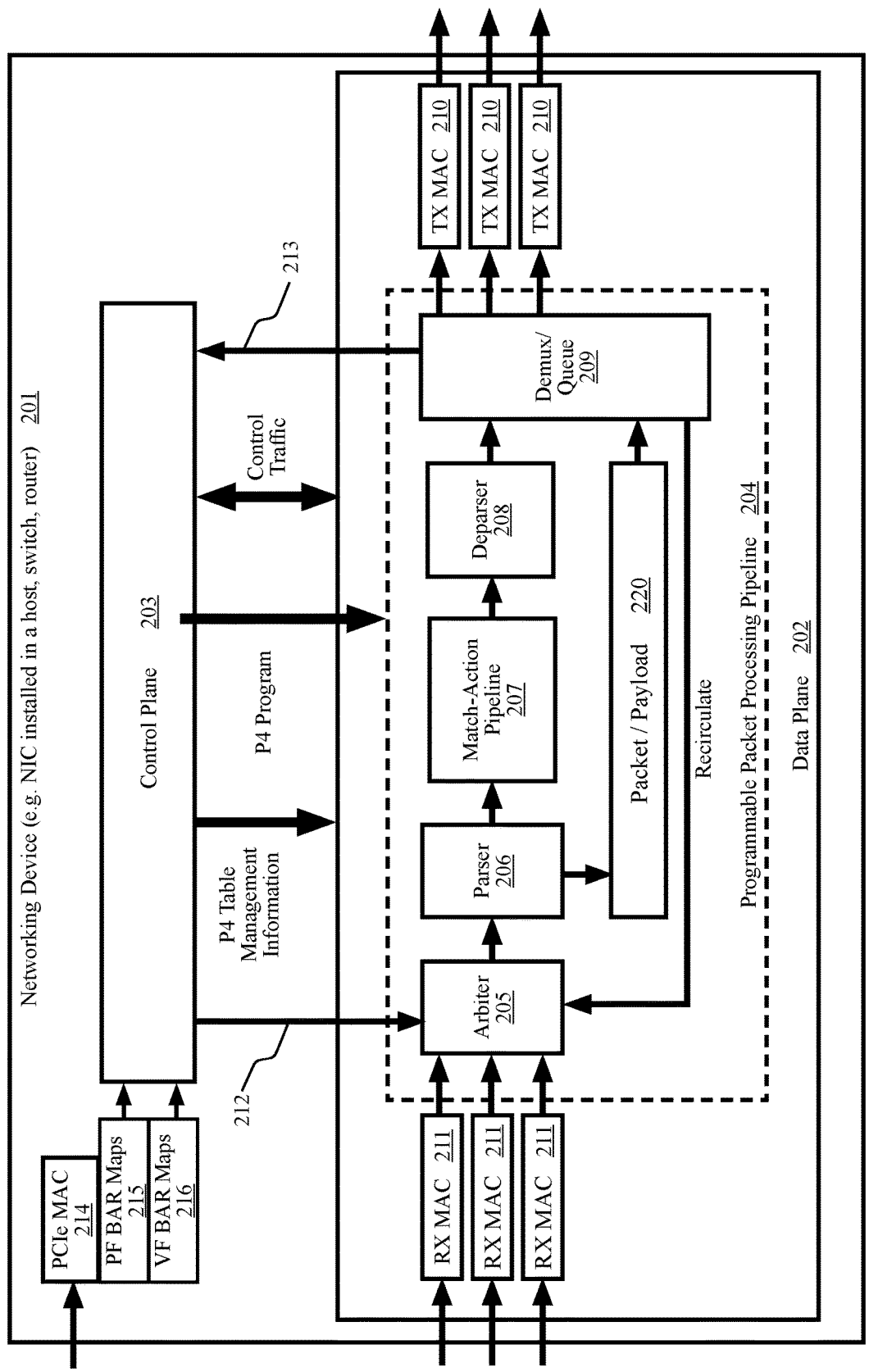
FIG. 2 is a functional block diagram of a networking device having a control plane and a data plane and in which aspects may be implemented.

FIG. 2 is a functional block diagram of a networking device having a control plane and a data plane and in which aspects may be implemented. A networking device 201 may have a control plane 203 and a data plane 202. The control plane may be implemented by a general purpose processor such as a central processing unit (CPU) containing one or more CPU cores. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of networking devices that are used in data networks. For example, the concept of a domain-specific language for programming protocol-independent packet processors, known simply as "P4," has developed to provide some flexibility at the data plane of a networking device. The document "P4$_{16}$ Language Specification," published by the P4 Language Consortium is well known in the field and describes the P4 domain-specific language that may be used for programming the data plane of networking devices. P4 (also referred to herein as the "P4 specification," the "P4 language," and the "P4 program") is designed to be implementable on a large variety of targets including switches, routers, programmable NICs, software switches, semiconductor chip, FPGAs, and ASICs. As described in the P4 specification, the primary abstractions provided by the P4 language relate to header types, parsers, tables, actions, match-action units, match-action pipeline stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a layer 2 protocol such as Ethernet. The layer 2 protocol may be Ethernet and the RX MACs may be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs may be configured to implement operations related to, for example, transmitting frames, half-duplex retransmission, and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane may use a dedicated channel or bus, may use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane. The data plane corresponds to a class of algorithms that describe transformations on packets by packet processing systems.

The data plane 202 includes a programmable packet processing pipeline 204 that is programmable using a domain-specific language such as P4. As described in the P4 specification, a programmable packet processing pipeline may include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 may act as an ingress unit receiving packets from RX MACs 211 and may also receive packets from the control plane via a control plane packet input 212. The arbiter 205 may also receive packets that are recirculated to it by the demux/queue 209. The demux/queue 209 may act as an egress unit and may also be configured to send packets to a drop port (the packets thereby disappear), to the arbiter via recirculation, and to the control plane 203 via an output central processing unit (CPU) port 213. The arbiter 205 and the demux/queue 209 may be configured through the domain-specific language (e.g., P4).

The parser 206 is a programmable element that may be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser may be referred to as a packet header vector (PHV). The parser may identify certain fields of the header and may extract the data corresponding to the identified fields to generate the PHV. The PHV may include other data (often referred to as "metadata") that is related to the packet but not extracted directly from the header, including for example, the port or interface on which the packet arrived at the networking device. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A networking device 201 may have a peripheral component interconnect extended (PCIe) interface such as PCIe media access control (MAC) 214. A PCIe MAC may have a base address register (BAR) at a base address in a host system's memory space. Processes, typically device drivers within the host system's operating system, may communicate with a NIC via a set of registers beginning with the BAR. Some PCIe devices are single root input output virtualization (SR-IOV) capable. Such PCIe devices may have a physical function (PF) and a virtual function (VF). A PCIe SR-IOV capable device may have multiple VFs. A PF BAR map 215 may be used by the host machine to communicate with the PCIe card. A VF BAR map 216 may be used by a virtual machine (VM) running on the host to communicate with the PCIe card. Typically, the VM may access the NIC using a device driver within the VM and at a memory address within the VMs memory space. Many SR-IOV capable PCIe cards may map that location in the VM's memory space to a VF BAR. As such a VM may be configured as if it has its own NIC while in reality it is associated with a VF provided by a SR-IOV capable NIC. As discussed below, some PCIe devices may have multiple PFs. For example, a NIC may provide network connectivity via one PF and may provide an InfiniBand channel adapter via another PF. As such, the NIC may provide "NIC" VFs and "InfiniBand" VFs to VMs running on the host. The InfiniBand PF and VFs may be used for data transfers, such as remote direct memory access (RDMA) transfers to other VMs running on the same or other host computers. Similarly, a NIC may provide non-volatile memory express (NVMe) and small computer system interface (SCSI) PFs and VFs to VMs running on the host.

Figure 3:
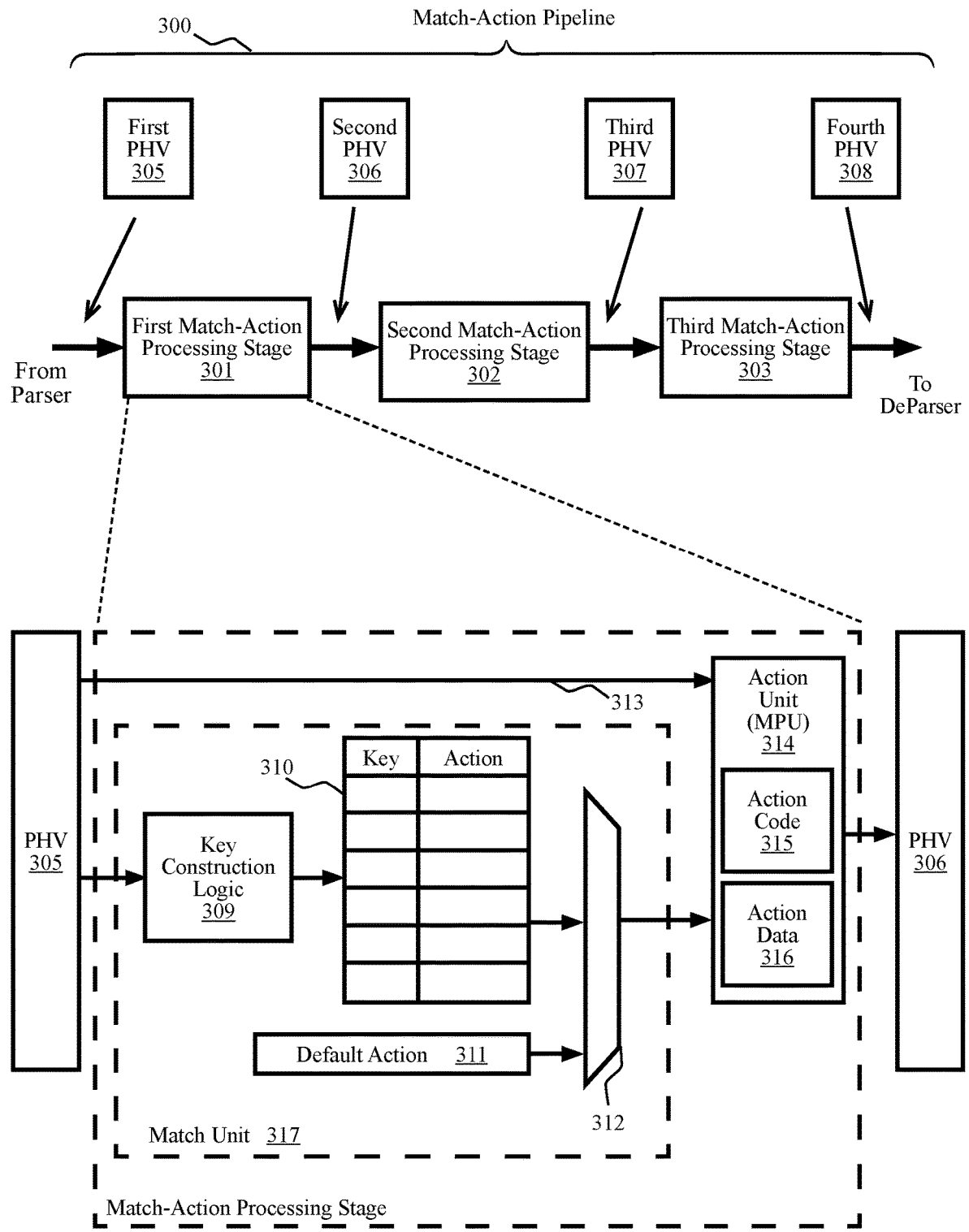
FIG. 3 is a functional block diagram illustrating an example of a match-action processing stage in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often called stages or match-action processing stages, of the packet processing pipeline. The match-action processing stages 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action processing stages in the match-action pipeline in series and each match-action processing stage may implement a match-action operation or policy. The PHV and/or table entries may be updated in each stage of match-action processing according to the actions specified by the P4 programming. In some instances, a packet may be recirculated through the match-action pipeline, or a portion thereof, for additional processing. The first match-action processing stage 301 receives the first PHV 305 as an input and outputs the second PHV 306. The second match-action processing stage 302 receives the second PHV 306 as an input and outputs the third PHV 307. The third match-action processing stage 303 receives the third PHV 307 as an input and outputs the fourth PHV 308. The match-action processing stages are arranged as a match-action pipeline that passes the PHVs from one match-action processing stage to the next match-action processing stage in the pipeline.

An expanded view of elements of a match-action processing stage 301 of match-action pipeline 300 is shown. The match-action processing stage includes a match unit 317 (also referred to as a "table engine") that operates on an input PHV 305 and an action unit 314 that produces an output PHV 306, which may be a modified version of the input PHV 305. The match unit 317 may include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair may include a key (e.g., a lookup key) and corresponding action code 315 and/or action data 316. A P4 lookup table may be viewed as a generalization of traditional switch tables, and may be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action processing stages may be programmable by the control plane via P4 and the contents of the lookup table (e.g., a flow table) may be managed by the control plane.

Figure 4:
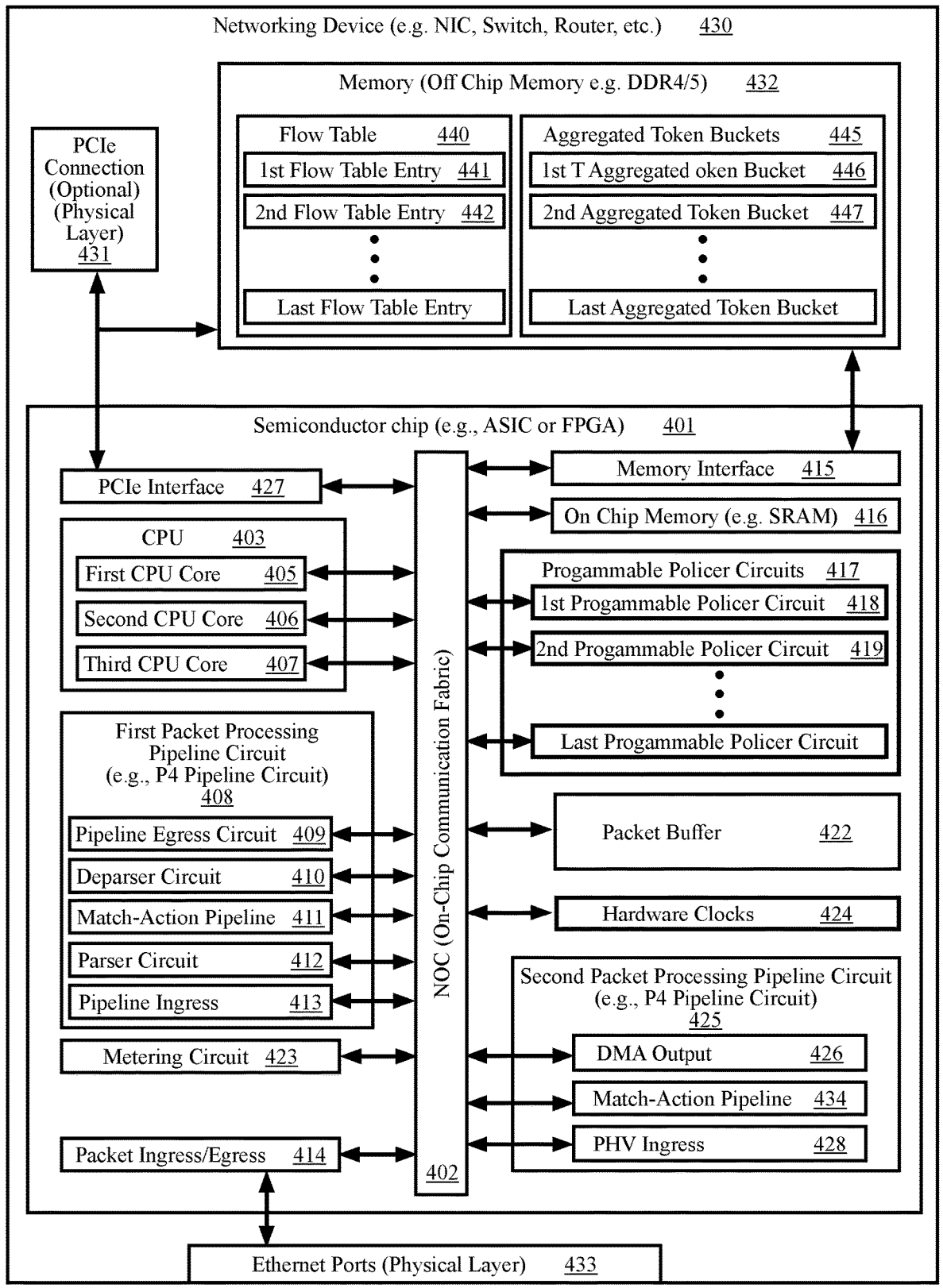
FIG. 4 is a functional block diagram of a networking device having a semiconductor chip such as an application specific integrated circuit (ASIC) or field programmable gate array (FPGA), according to some aspects.

FIG. 4 is a functional block diagram of a networking device 430 having a semiconductor chip 401 such as an ASIC or FPGA, according to some aspects. The semiconductor chip 401 shows a single semiconductor chip implementing a large number of hardware functions. A different and substantially equivalent implementation may employ a chiplet architecture. If the networking device is a network interface card (NIC) then the NIC may be installed in a host computer and may act as a networking device for the host computer and for virtual machines running on the host computer. Such a NIC may have a PCIe connection 431 for communicating with the host computer via a host PCIe connection. The networking device 430 may have a semiconductor chip 401, off-chip memory 432, and ethernet ports 433. The off-chip memory 432 may be one of the widely available memory modules or chips such as double data rate 5 (DDR5) synchronous dynamic random-access memory (SDRAM) such that the semiconductor chip 401 has access to many gigabytes of memory on the networking device 430. The ethernet ports 433 provide physical connectivity to a computer network such as the internet. The NIC may include a printed circuit board to which the semiconductor chip 401 and the memory 432 are attached.

The semiconductor chip may have many core circuits interconnected by an on-chip communications fabric, sometimes called a network on a chip (NOC) 402. NOCs are often implementations of standardized communications fabrics such as the widely used advanced extensible interface (AXI) bus. The semiconductor chip's core circuits may include a PCIe interface 427, CPU 403, first packet processing pipeline circuit 408, memory interface circuit 415, on-chip memory 416 that may be a static random access memory (SRAM), programmable policer circuits 417, a packet buffer 422, metering circuit 423, and packet ingress/egress circuits 414. The PCIe interface 427 may be used to communicate with a host computer via the PCIe connection 431. The CPU 403 may include numerous CPU cores such as a first CPU core 405, a second CPU core 406, and a third CPU core 407. The CPU 403 may implement the control plane of the networking device 430. The first packet processing pipeline circuit 408 may include a pipeline ingress circuit 413, a parser circuit 412, match-action pipeline 411, a deparser circuit 410, and a pipeline egress circuit 409. The second packet processing pipeline circuit 425 may include a PHV ingress circuit 428, a match-action pipeline 434, and a direct memory access (DMA) output circuit 426. The programmable policer circuits 417 may include a first programmable policer circuit 418, a second programmable policer circuit 419, and a last programmable policer circuit. A programmable policer circuit is a hardware implemented circuit that may be used for policing network flows. The specific core circuits implemented within the non-limiting example of the semiconductor chip 401 may be selected such that the semiconductor chip implements many, perhaps all, of the functionality of an InfiniBand channel adapter, of an NVMe card, and of a networking device that processes network flows carried by internet protocol (IP) packets.

A network device may include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks may be used as timestamps for events such as enqueuing/dequeuing a packet.

The first packet processing pipeline circuit 408 is a specialized set of elements for processing PHVs including PHVs for network packets such as internet protocol (IP) packets and InfiniBand protocol data units (PDUs). The data plane may be implemented by a packet processing pipeline circuit such as the first packet processing pipeline circuit 408. The first packet processing pipeline circuit 408 may be a P4 packet processing pipeline circuit that implements a P4 pipeline that may be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The second packet processing pipeline circuit 425 is a specialized set of elements for processing PHVs including PHVs for network packets such as internet protocol (IP) packets and InfiniBand protocol data units (PDUs). The second packet processing pipeline circuit 425 may be a P4 packet processing pipeline circuit that implements a P4 pipeline that may be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata. The data plane may be implemented by the first packet processing pipeline circuit 408 in combination with the second packet processing pipeline circuit 425.

The networking device 430 may include a memory 432 for running Linux or some other operating system and for storing data used by the processes implementing network services, upgrading the control plane, and upgrading the data plane. The networking device may use the memory 432 to store a flow table 440. The flow table may include flow table entries such as a first flow table entry 441, a second flow table entry 442, and a last flow table entry. The memory 432 may also store aggregated token buckets 445 such as a first aggregated token bucket 446, a second aggregated token bucket 447, and a last aggregated token bucket. In some implementations, flow tables or aggregated token buckets are stored in the on-chip memory 416 of the semiconductor chip 401 such that the token buckets and flow table entries may be more rapidly accessed by the packet processing pipeline circuits 408, 425 and the metering circuit 423 illustrated in FIG. 10.

The CPU cores 405, 406, 407 may be general purpose processor cores, such as ARM processor cores, microprocessor without interlocked pipelined stages (MIPS) processor cores, and/or x86 processor cores, as is known in the field. Each CPU core may include an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU 403 may also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 405, 406, 407 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 may act as a central on-chip packet switch that delivers packets from the network interfaces 433 to packet processing elements of the data plane and vice-versa. The packet processing elements may include a slow data path implemented in software and a fast data path implemented by a packet processing pipeline circuits 408, 425.

The first packet processing pipeline circuit 408 may be a specialized circuit or part of a specialized circuit using one or more semiconductor chips such as ASICs or FPGAs to implement programmable packet processing pipelines such as the programmable packet processing pipeline 204 of FIG. 2. Some networking devices include semiconductor chips such as ASICs or FPGAs implementing a P4 pipeline of a data plane within the networking device.

All data transactions in the semiconductor chip 401, including on-chip memory transactions, and register reads/writes may be performed via a coherent interconnect 402. In one non-limiting example, the coherent interconnect may be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the first packet processing pipeline circuit 408, the second packet processing pipeline circuit 425, CPU 403, memory interface circuit 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
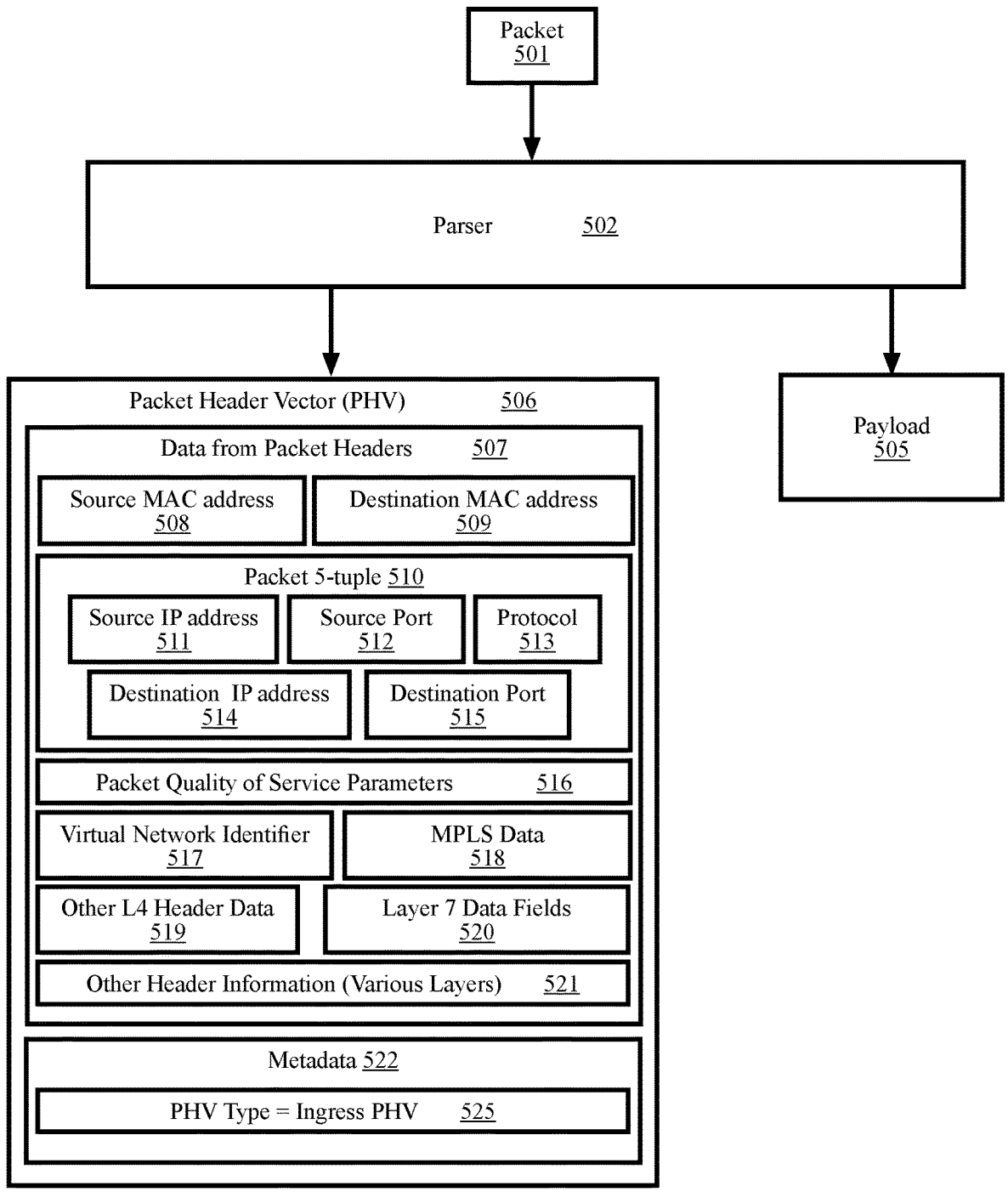
FIG. 5 is a high-level diagram illustrating an example of generating a packet header vector from a packet according to some aspects.

FIG. 5 is a high-level diagram illustrating an example of generating an ingress packet header vector 506 from a packet 501 according to some aspects. The PHV 506 is an ingress PHV that is produced by a parser 502 parsing a packet 501 received via an ingress port as a bit stream. The parser 502 may receive a packet 501 that has layer 2, layer 3, layer 4, and layer 7 headers and payloads. The parser may generate a packet header vector (PHV) from packet 501. The packet header vector 506 may include many data fields including data from packet headers 507 and metadata 522. The metadata 522 may include data generated by the networking device such as the hardware port on which the packet 501 was received and the packet timestamps indicating when the packet 501 was received by the networking device, enqueued, dequeued, etc. The metadata 522 may also include data produced by the networking device while processing a packet or assembling a packet. Such metadata 522 may include a PHV type 525 (e.g., Ingress PHV).

The source MAC address 508 and the destination MAC address 509 may be obtained from the packet's layer 2 header. The source IP address 511 may be obtained from the packet's layer 3 header. The source port 512 may be obtained from the packet's layer 4 header. The protocol 513 may be obtained from the packet's layer 3 header. The destination IP address 514 may be obtained from the packet's layer 3 header. The destination port 515 may be obtained from the packet's layer 4 header. The packet quality of service parameters 516 may be obtained from the packet's layer 3 header or another header based on implementation specific details. The layer 4 header data 517 may be obtained from the packet's layer 4 header. The multi-protocol label switching (MPLS) data 518, such as an MPLS label, may be obtained from the packet's layer 2 header. The layer 7 header data 519 may be obtained from the packet's layer 7 header. The other layer 7 data fields 520 may be obtained from the packet's layer 7 payload. The other header information 521 is the other information contained in the packet's layer 2, layer 3, layer 4, and layer 7 headers.

The packet 5-tuple 510 is often used for generating keys for looking up and reading entries in key-value tables such as flow tables. The packet 5-tuple 510 may include the source IP address 511, the source port 512, the protocol 513, the destination IP address 514, and the destination port 515.

Those practiced in computer networking protocols realize that the headers carry much more information than that described here, realize that substantially all of the headers are standardized by documents detailing header contents and fields, and know how to obtain those documents. The parser may also be configured to output a payload 505. Recalling that the parser 502 is a programmable element that is configured through the domain-specific language (e.g., P4) to extract information from a packet, the specific contents of the payload 505 are those contents specified via the domain specific language. For example, the contents of the payload 505 may be the layer 4 payload, the layer 7 payload, etc.

Figure 6:
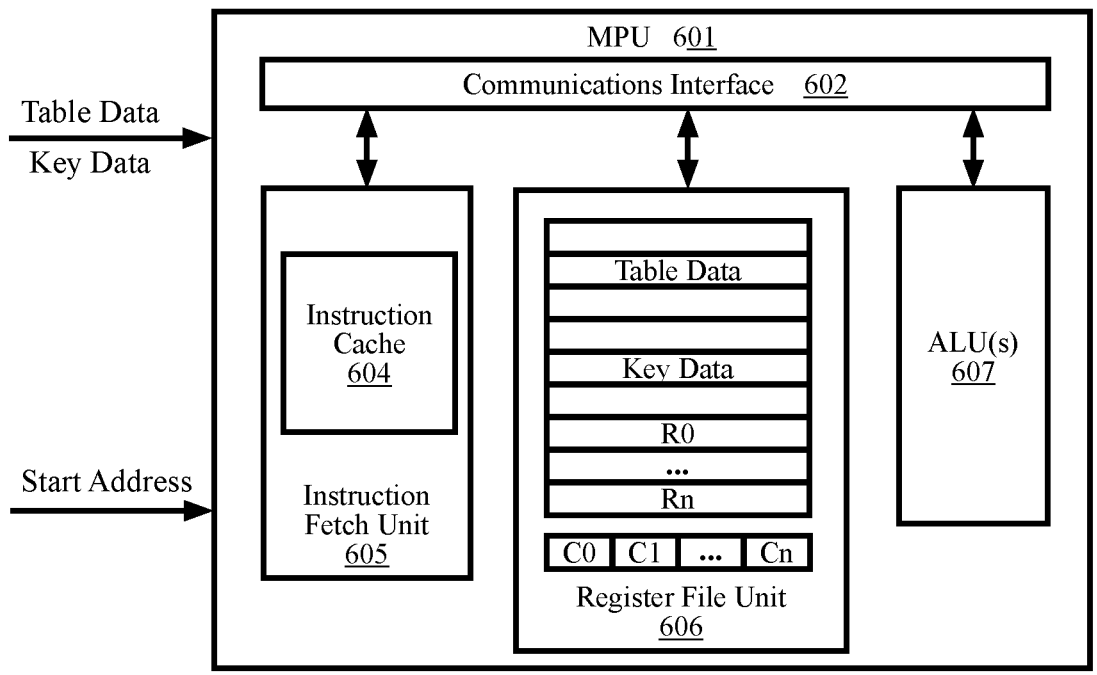
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 may have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 may have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the on-chip communications fabric system according to the examples in the present specification, it may also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 may have an instruction fetch unit 605 configured to fetch instructions from a memory external to the MPU based on the table lookup result or at least a portion of the table lookup result. The instruction fetch unit may support branches and/or linear code paths based on table results or a portion of a table result provided by a table engine. In some cases, the table result may comprise table data, key data and/or a start address of a set of instructions/program. The instruction fetch unit 605 may have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region may be identified by the address. In some cases, the one or more programs may be fetched and loaded from an external memory via the communication interface 602. This provides flexibility to allow for executing different programs associated with different types of data using the same processing unit. In an example, a management PHV may be injected into the pipeline, for example to perform administrative table direct memory access (DMA) operations or entry aging functions (i.e., adding timestamps), one of the management MPU programs may be loaded to the instruction cache to execute the management function. The instruction cache 604 may be implemented using various types of memories such as one or more SRAMs.

The one or more programs may be any programs such as P4 programs related to reading table data, building headers, DMA to/from memory, writing to/from memory, and various other actions. The one or more programs may be executed in any match-action processing stage.

The MPU 601 may have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some MPUs, each register of the register file is 64 bits and may be initially loaded with special metadata values such as hash value from table lookup, packet size, PHV timestamp, programmable table constant and the like.

The register file unit 606 may have a comparator flags unit (e.g., C0, C1, . . . Cn) configured to store comparator flags. The comparator flags may be set by calculation results generated by the ALU which in return may be compared with constant values in an encoded instruction to determine a conditional branch instruction. The MPU may have one-bit comparator flags (e.g., 8 one-bit comparator flags). In practice, an MPU may have any number of comparator flag units, each of which may have any suitable length.

The MPU 601 may have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 may have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU may have one or more types of counters for different purposes. For example, the MPU may have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

A single MPU may be configured to execute instructions of a program until completion of the program. Multiple MPUs may be configured to execute a program. A table result may be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
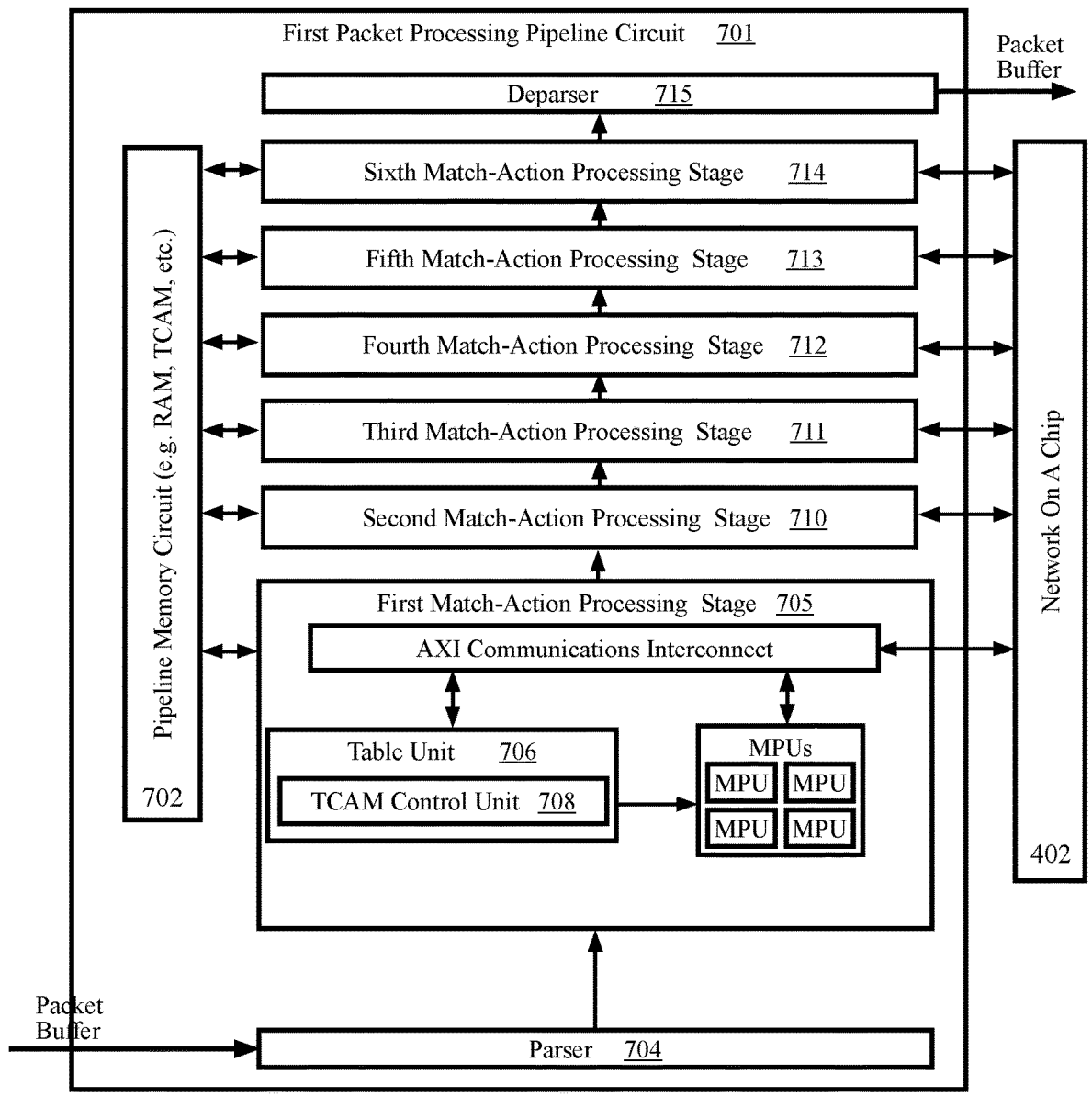
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. The packet processing pipeline circuit 701 may be a P4 pipeline circuit in a semiconductor chip. The packet processing pipeline circuit 701 may be programmed to provide various features, including, but not limited to, routing, bridging, tunneling, forwarding, network ACLs, layer 4 firewalls, flow based rate limiting, VLAN tag policies, membership, isolation, multicast and group control, label push/pop operations, layer 4 load balancing, layer 4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that may be mapped onto the table engine and MPU stages. The match-action pipeline may have a plurality of stages. For example, a packet entering the pipeline may be first parsed by a parser stage (e.g., parser 704) according to the packet header stack specified by a P4 program. This parsed representation of the packet may be referred to as a packet header vector (PHV). The PHV may then be passed through match-action processing stages (e.g., match-action processing stages 705, 710, 711, 712, 713, 714) of the match-action pipeline. Each match-action processing stage may be configured to match one or more PHV fields to tables and to update the PHV, table entries, or other data according to the actions specified by the P4 program. If the required number of stages exceeds the implemented number of stages, a packet may be recirculated for additional processing. The packet payload may travel in a separate queue or buffer until it is reassembled with its PHV in a deparser 715. The deparser 715 may rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The networking device 430 of FIG. 4 may have a P4 pipeline that is implemented via a packet processing pipeline circuit 701.

A pipeline may have multiple parsers and may have multiple deparsers. The parser may be a P4 compliant programmable parser and the deparser may be a P4 compliant programmable deparser. The parser may be configured to extract packet header fields according to P4 header definitions and place them in a PHV. The parser may select from any fields within the packet and align the information from the selected fields to create the PHV. The deparser may be configured to rewrite the original packet according to an updated PHV. The pipeline MPUs of the match-action processing stages 705, 710, 711, 712, 713, 714 may be the same as the MPU 601 of FIG. 6. Match-action processing stages may have any number of MPUs. The match-action processing stages of a match-action pipeline may all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine may be distributed to the multiple MPUs.

The table engine 706 may be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 may have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline may have multiple match-action processing stages such as the six units illustrated in the example of FIG. 7. In practice, a match-action pipeline may have any number of match-action processing stages. The match-action processing stages may share a pipeline memory circuit 702 that may be static random-access memory (SRAM), TCAM, some other type of memory, or a combination of different types of memory. The packet processing pipeline circuit stores data in the pipeline memory circuit. For example, the packet processing pipeline circuit may store a table in the pipeline memory circuit that configures the packet processing pipeline circuit to process specific network flows. For example, a flow table or multiple flow tables may be stored in the pipeline memory circuit 702 and may store instructions and data that the packet processing pipeline circuit uses to process a packet. The pipeline memory circuit is more than half full when it is storing data used by the packet processing pipeline circuit and less than half the capacity of the pipeline memory circuit is free.

The second match-action pipeline circuit 425 includes a match-action pipeline 434. That match-action pipeline 434 may include match-action processing stages such as match-action processing stages 705, 710, 711, 712, 713, 714.

Figure 8:
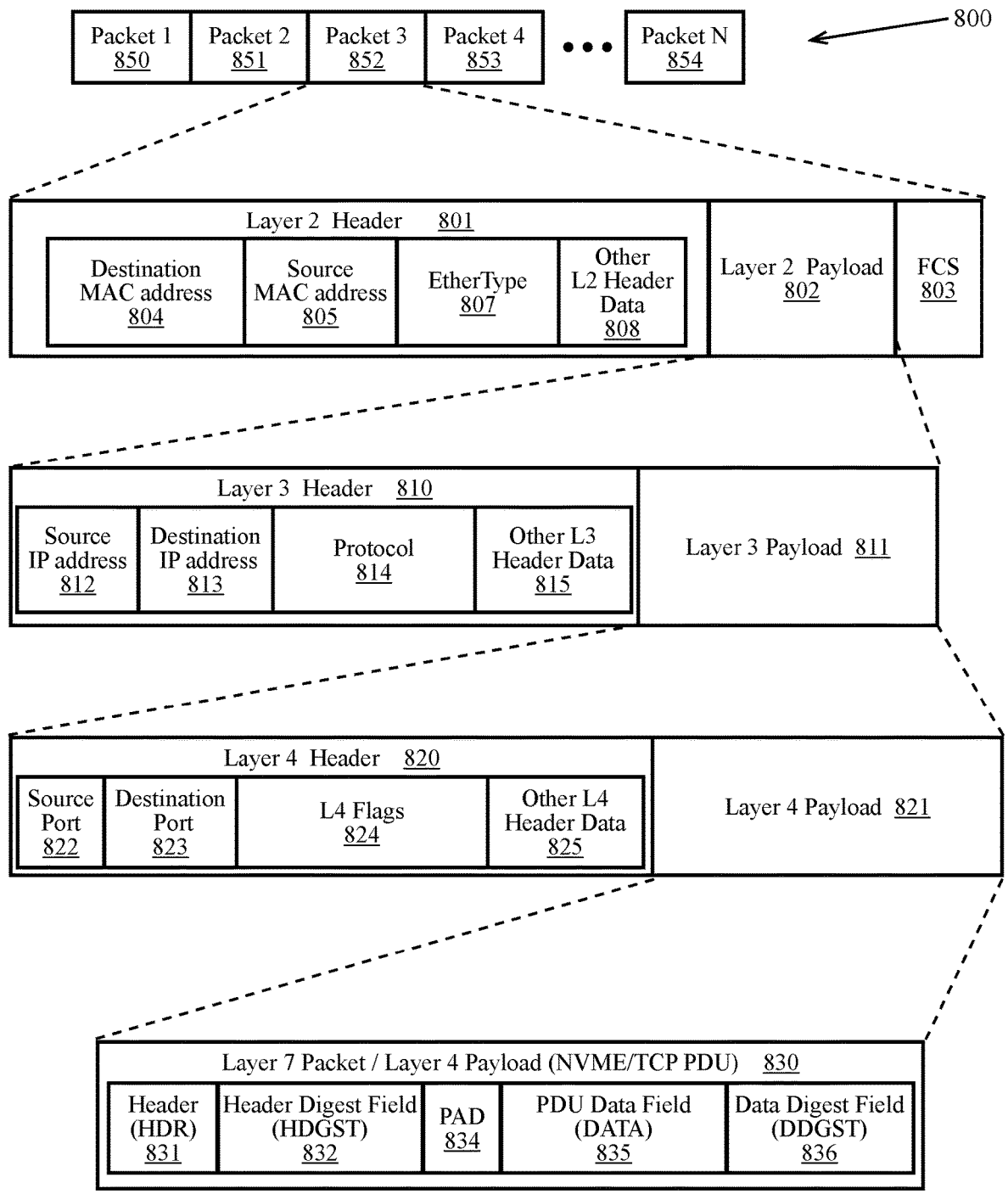
FIG. 8 illustrates packet headers and payloads of packets for network flows including a NVMe/TCP PDU in a layer 4 payload according to some aspects.

FIG. 8 illustrates packet headers and payloads of packets for a network flow 800 including layer 7 fields according to some aspects. A group of network packets passing from one specific endpoint to another specific endpoint is a network flow. A network flow 800 may have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets may be constructed and interpreted in accordance with the internet protocol suite. The Internet protocol suite is the conceptual model and set of communications protocols used in the Internet and similar computer networks. A packet may be transmitted and received as a raw bit stream over a physical medium at the physical layer, sometimes called layer 1. The packets may be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet (an Ethernet packet is shown) has a layer 2 header 801, a layer 2 payload 802, and a layer 2 frame check sequence (FCS) 803. The layer 2 header may contain a source MAC address 804, a destination MAC address 805, an optional 802.1Q header 806, optional VLAN tag information 807, and other layer 2 header data 808. The input ports 211 and output ports 210 of a networking device 201 may have MAC addresses. A networking device 201 may have a MAC address that is applied to all or some of the ports. Alternatively, a networking device may have one or more ports that each have their own MAC address. In general, each port may send and receive packets. As such, a port of a networking device may be configured with a RX MAC 211 and a TX MAC 210. Ethernet, also known as Institute of Electrical and Electronics Engineers (IEEE) 802.3, is a layer 2 protocol. IEEE 802.11 (WIFI) is another widely used layer 2 protocol. The layer 2 payload 802 may include a layer 3 packet. The layer 2 FCS 803 may include a CRC (cyclic redundancy check) calculated from the layer 2 header and layer 2 payload. The layer 2 FCS may be used to verify that the packet has been received without errors.

IEEE 802.1Q is the networking standard that supports VLANs on IEEE 802.3 networks. The optional 802.1Q header 806 and VLAN tag information 807 are specified by the IEEE 802.1Q standard. The 802.1Q header is the two-octet value 0x8100 that indicates that VLAN tag information 807 is present. The VLAN tag information includes a 12-bit VLAN identifier. As such, a LAN may be configured to have 4094 VLANs (0x000 and 0xFFF are reserved values).

The internet layer, often called layer 3, is the network layer where layer 3 packets may be routed from a first node to a second node across multiple intermediate nodes. The nodes may be networking devices such as networking device 201. Internet protocol (IP) is a commonly used layer 3 protocol that is specified in requests for comment (RFCs) published by the Internet Engineering Task Force (IETF). More specifically, the format and fields of IP packets are specified by IETF RFC 791. The layer 3 packet (an IP packet is shown) may have a layer 3 header 810 and a layer 3 payload 811. The layer 3 header of an IP packet is an IP header and the layer 3 payload of an IP packet is an IP payload. The layer 3 header 810 may have a source IP address 812, a destination IP address 813, a protocol indicator 814, and other layer 3 header data 815. In general, a packet is directed from a source machine at the source IP address 812 and is directed to the destination machine at the destination IP address 813. As an example, a first node may send an IP packet to a second node via an intermediate node. The IP packet therefore has a source IP address indicating the first node and a destination IP address indicating the second node. The first node may make a routing decision to send the IP packet to the intermediate node. The first node may therefore send the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node may make a routing decision to send the IP packet to the second node. The intermediate node may then send the IP packet to the second node in a second layer 2 packet having a source MAC address 804 indicating the intermediate node, a destination MAC address 805 indicating the second node, and the IP packet as a payload. The layer 3 payload 811 may include headers and payloads for higher layers in accordance with higher layer protocols such as transport layer protocols.

The transport layer, often called layer 4, may establish basic data channels that applications use for task-specific data exchange and may establish host-to-host connectivity. A layer 4 protocol may be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP is often referred to as TCP/IP. TCP is connection oriented and may provide reliable, ordered, and error-checked delivery of a stream of bytes between applications running on hosts communicating via an IP network. When carrying TCP data, a layer 3 payload 811 includes a TCP header and a TCP payload. UDP may provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet (a TCP packet is shown) may have a layer 4 header 820 (a TCP header is shown) and a layer 4 payload 821 (a TCP payload is shown). The layer 4 header 820 may include a source port 822, destination port 823, layer 4 flags 824, and other layer 4 header data 825. The source port and the destination port may be integer values used by host computers to deliver packets to application programs configured to listen to and send on those ports. The layer 4 flags 824 may indicate a status of or action for a network flow. A layer 4 payload 821 may contain a layer 7 packet.

The application layer, often called layer 7, includes the protocols used by most applications for providing user services or exchanging application data over the network connections established by the lower level protocols. Examples of application layer protocols include NVMe/TCP, RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols may be encapsulated into transport layer protocol data units (such as TCP or UDP messages), which in turn use lower layer protocols to effect actual data transfer.

A layer 4 payload 821 may include a layer 7 packet 830. The illustrated layer 7 packet is a NVMe/TCP PDU 830. NVM Express, Inc. is a trade organization that provides standards for NVMe communications. Version 1.0 of the NVM Express TCP Transport Specification was published on May 18, 2021 and discloses the contents and structure of NVMe PDUs. An NVMe/TCP PDU may include a header 831, a header digest field 832, a pad 834, a PDU data field 835, and a data digest field 836. The PDU data field 835 may hold numerous encrypted blocks. When the PDU data field 835 holds numerous encrypted blocks, the data digest field 836 may hold the digest value for the entire PDU data field 835. Such a digest value may be determined from the individual digest values of the numerous encrypted blocks in the PDU data field.

Figure 9:
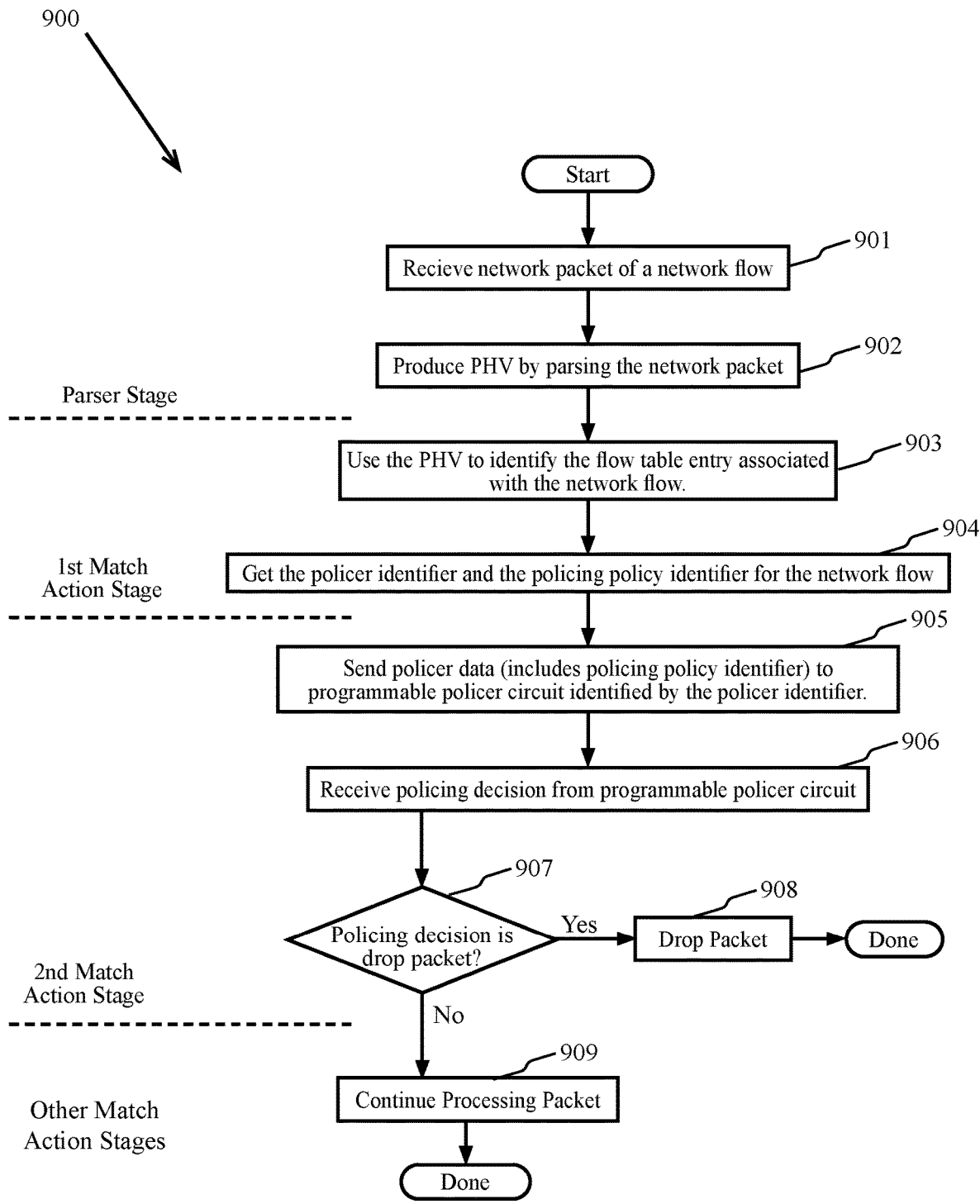
FIG. 9 illustrates a high-level flow diagram of a packet processing pipeline obtaining a policing decision from a programmable policer circuit, according to some aspects.

FIG. 9 illustrates a high-level flow diagram of a process 900 that may be implemented by packet processing pipeline obtaining a policing decision from a programmable policer circuit, according to some aspects. After the start, a network packet in a network flow is received at block 901. At block 902, a PHV is produced by parsing the network packet. At block 903, the PHV is used to identify a flow table entry. The network packet is in a network flow and the flow table entry may be used for processing all the network packets in the network flow. For example, the workload (e.g., a VM or other network endpoint) may send a network packet in a network flow that is a storage flow. All the network packets in a network flow may have the same 5-tuple. The network flow may be identified as a storage flow from the 5-tuple, the presence of a NVMe/TCP PDU in the network packets of the network flow, etc. Those practiced in computer networking realize that TCP ports 8009 and 4420 are default ports for NVMe/TCP and that other storage protocols may use known default ports, or protocol identifiers. In another example, the workload may send a network packet in a network flow that is a non-storage flow. The network flow may be identified as a non-storage flow from the 5-tuple, the presence of HTTP or HTTPS headers or data in the network packets of the network flow, etc. Those practiced in computer networking realize that port 80 is the default port for HTTP, port 443 is the default port for HTTPS, and that other traffic may also have default ports. In general, the type of a network flow may be determined from the 5-tuple and other PHV contents.

At block 904, the programmable policer identifier and the policing policy identifier may be read from the flow table entry. The programmable policer identifier identifies one of the programmable policer circuits. At block 905, policer data may be sent to the programmable policer circuit. The policer data may include the policing policy identifier and a resources required value (e.g., the packet size in bytes). At block 906, a policing decision may be received from the programmable policer circuit. At decision block 907, the process may determine if the policing decision is to drop the packet. If the policing decision is to drop the packet, the process may move to block 908. Otherwise, the process may move to block 909. At block 908, the packet is dropped and the process is done. At block 909, the packet processing pipeline circuit continues processing the network packet and may produce a processed network packet that is transmitted from the egress port of the networking device.

FIG. 10 is a high-level conceptual diagram illustrating a metering circuit refilling the tokens in a token bucket 1001 that may be used as an aggregated token bucket according to some aspects. A semiconductor chip such as the semiconductor chip 401 illustrated in FIG. 4 may include the metering circuit 423. The token bucket in the illustrated example is a leaky token buck. The token bucket 1001 may include a tokens value 141, a token add rate value 1003, and a maximum tokens value 1004. The tokens value 141 indicates how many tokens are in the bucket. The token add rate value 1003 indicates the number of tokens to be added to the tokens value 141 every metering interval. The max tokens value 1004 indicates the maximum number of tokens that may be in the token bucket 1001. The tokens value may be a signed integer. Max tokens 1004 and the token add rate 1003 may be set based on the QoS that is to be provided to the workload or tenant running the workload. An interval timer 1005 may trigger the metering circuit 423 every metering interval (e.g., every 0.1 seconds). Every time it is triggered, the metering circuit 423 may add the number of tokens indicated by the token add rate 1003 to the tokens value 141 up to the maximum indicated by the maximum token value 1004. The tokens may be removed from the token bucket by a programmable policer circuit 123. A number of tokens are removed from the token bucket by subtracting that number from the tokens value. For example, 10 tokens are removed by subtracting 10 from the tokens value. For example, in FIG. 1 the programmable policer circuit 123 may remove tokens by subtracting the packet size 121 from the tokens value 141.

FIG. 11 is a high-level conceptual diagram illustrating policing policy identifiers 1102 that are associated with policing policies 1103, according to some aspects. The policies identified with the identifiers are presented in the example of FIG. 11 as a policer policy table 1101. In many implementations, there is no explicit table. For example, the programmable policer circuit may be a circuit that includes hardware blocks that perform different policing policies where one of the hardware blocks is selected by the value of the policing policy identifier. The programmable policer circuit may implement a policing policy that produces a "drop" policing decision when the policing policy identifier equals 0 and allowing the packet would cause the tokens value to be less than a threshold value. For example, a value equaling the tokens value minus the resources required (e.g., packet size) may be stored in a first register of the programmable policer circuit and the threshold value may be stored in a second register of the policer circuit. If the value in the first register is less than the value in the second register, then allowing the packet may cause the tokens value to be less than a threshold value. If allowing the packet would not cause the tokens value to be less than a threshold value, then the programmable policer circuit may produce an "allow" policing decision and subtract the resources required value from the tokens value when the policing policy identifier equals 0. The threshold value is often zero, in which case a negative tokens value is less than the threshold value. The programmable policer circuit may implement a policing policy that always produces an "allow" policing decision and always subtracts the resources required value from the tokens value when the policing policy identifier equals 1. This policy would allow the packet even though allowing the packet would cause the tokens value to be less than a threshold value (e.g., less than 0). When the tokens value is less than the threshold value, the network packets for network flows that have a policing policy equaling 0 will always be dropped. No such network packet will be allowed until the tokens value equals or exceeds the threshold value. The tokens value may eventually become greater than the threshold value as the metering circuit 423 adds tokens to the token bucket. As such, the network flows having a policing policy equaling 1 are strictly prioritized over network flows having a policing policy equaling 0. The programmable policer circuit may implement a policing policy that produces an "allow" policing decision without reading or changing the tokens value when the policing policy identifier equals 2. Such a policy may be used within the data center for the network flows of infrastructure operations such as syncing flow tables between networking devices, configuration changes, etc.

Figure 12:
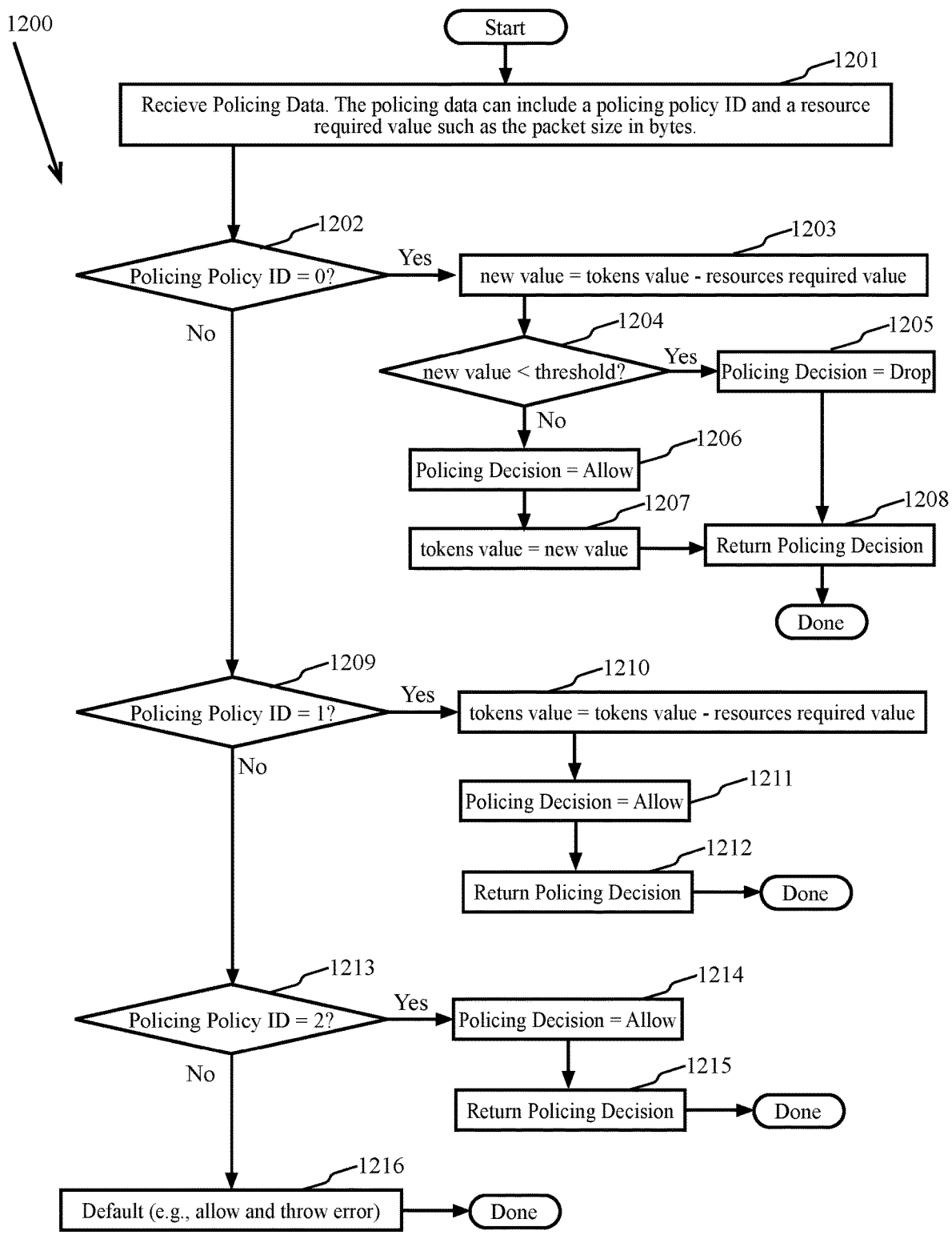
FIG. 12 is a high-level flow diagram illustrating an example of a process for producing policing decisions and that may be implemented by a programmable policer circuit, according to some aspects.

FIG. 12 is a high-level flow diagram illustrating an example of a process for producing policing decisions and that may be implemented by a programmable policer circuit, according to some aspects. After the start, policing data is received at block 1201. The policing data may include a policing policy ID and a resource required value such as the packet size in bytes. At decision block 1202, the process determines if the policing policy identifier equals 0. If the policing policy identifier equals 0 at decision block 1202, the process moves to block 1203 and otherwise moves to decision block 1209. At block 1203, the process may calculate a new value that equals the resources required value subtracted from the tokens value. At decision block 1204, the process determines if the new value is less than the threshold value (e.g., new value is negative when the threshold value is 0). If the new value is less than the threshold value at decision block 1204, the process moves to block 1205 and otherwise moves to decision block 1206. At block 1205, the policing decision is "drop". The policing decision is transmitted to the packet processing pipeline circuit at block 1208. At block 1206, the policing decision is "allow". At block 1207, the tokens value is set to the new value calculated at block 1203. The policing decision is transmitted to the packet processing pipeline circuit at block 1208.

At decision block 1209, the process determines if the policing policy identifier equals 1. If the policing policy identifier equals 1 at decision block 1209, the process moves to block 1210 and otherwise moves to decision block 1213. At block 1210, the process may decrease the tokens value by subtracting the resources required value from the tokens value. At block 1211, the policing decision is "allow". The policing decision is transmitted to the packet processing pipeline circuit at block 1212. At decision block 1213, the process determines if the policing policy identifier equals 2. If the policing policy identifier equals 2 at decision block 1213, the process moves to block 1214 and otherwise moves to block 1216. At block 1214, the policing decision is "allow". The policing decision is transmitted to the packet processing pipeline circuit at block 1215. If the process reaches block 1216, an error has occurred such as when there is no policing policy associated with the policing policy identifier. At block 1216, the process may perform a default operation such as raising an error flag or signaling an error.

Figure 13:
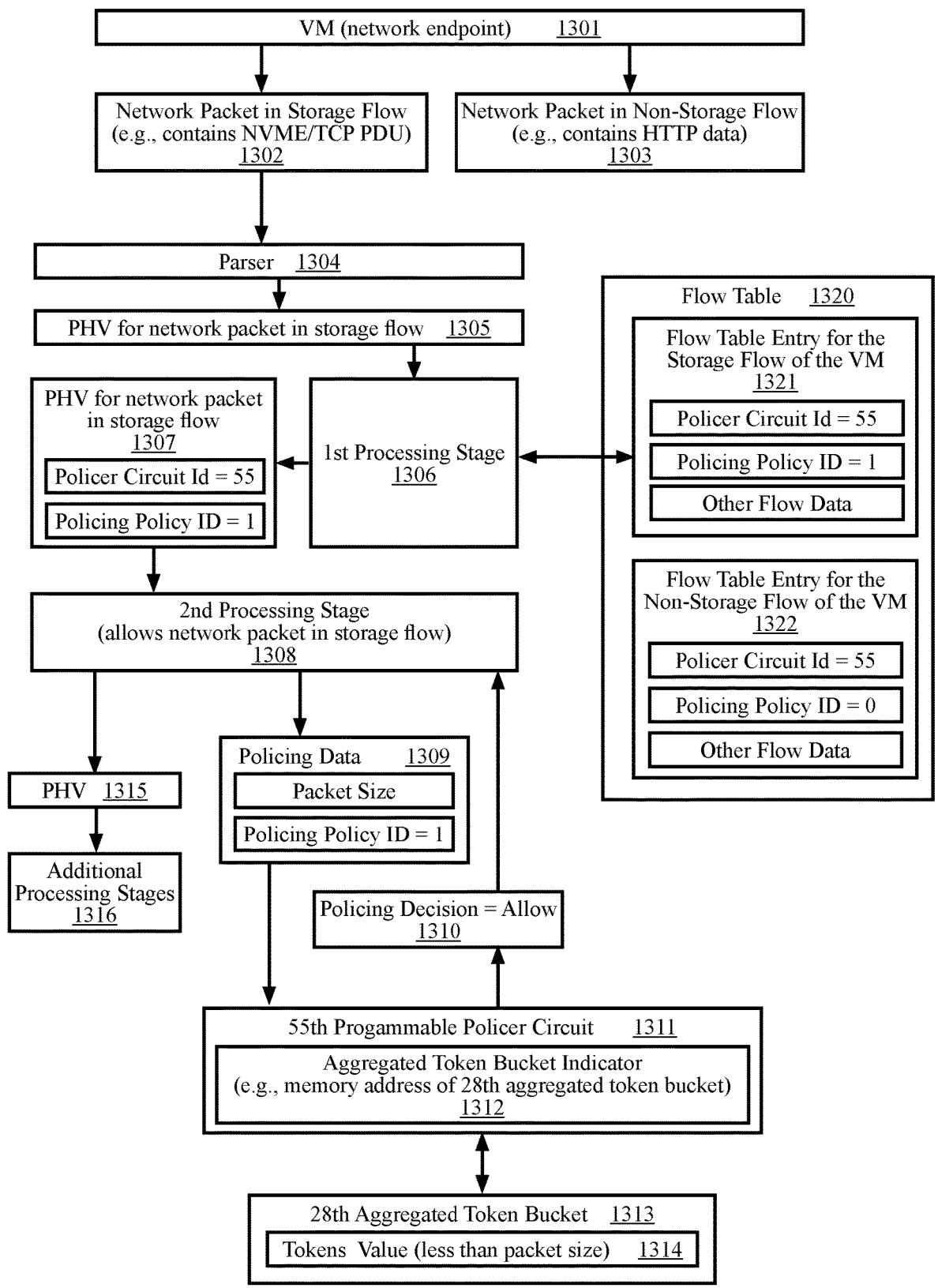
FIG. 13 is a high-level conceptual diagram illustrating an example of allowing a packet received from a network endpoint, according to some aspects.

FIG. 13 is a high-level conceptual diagram illustrating an example of allowing a packet received from a network endpoint 1301, according to some aspects. The network endpoint 1301 may be a VM attempting to send a storage packet 1302. A storage packet is a network packet in a storage flow. The parser 1304 parses the storage packet 1302 to produce a PHV 1305. The first processing stage 1306 reads the flow table entry 1321 for the storage flow from the flow table 1320. In this example, the programmable policer identifier is 55 and the policing policy identifier is 1. The first processing stage adds the programmable policer identifier and the policing policy identifier to the PHV 1307. The second processing stage 1308 receives the PHV 1307 and sends policing data 1309 to the 55th programmable policer circuit 1311, which is the programmable policer circuit identified by the programmable policer identifier. The policing data 1309 includes the packet size (the resources required value) and the policing policy identifier. The 55th programmable policer circuit 1311 is associated with the 28th aggregated token bucket 1313. For example, the programmable policer circuits may contain an aggregated token bucket identifier such as the memory address of the aggregated token bucket. The aggregated token bucket identifier 1312 of the 55th programmable policer circuit 1311 may identify the 28th aggregated token bucket 1313. In this example, the tokens value 1314 in the 28th aggregated token bucket 1313 is less than the packet size. When the policing policy identifier equals 1, the 55th programmable policer circuit 1311 produces an "allow" policing decision 1310 and subtracts the resources required value from the tokens value. The second processing stage receives the policing decision and passes the PHV 1315 to the other stages 1316 of the packet processing pipeline for further processing of the storage packet 1302 when the policing decision 1310 is "allow".

Figure 14:
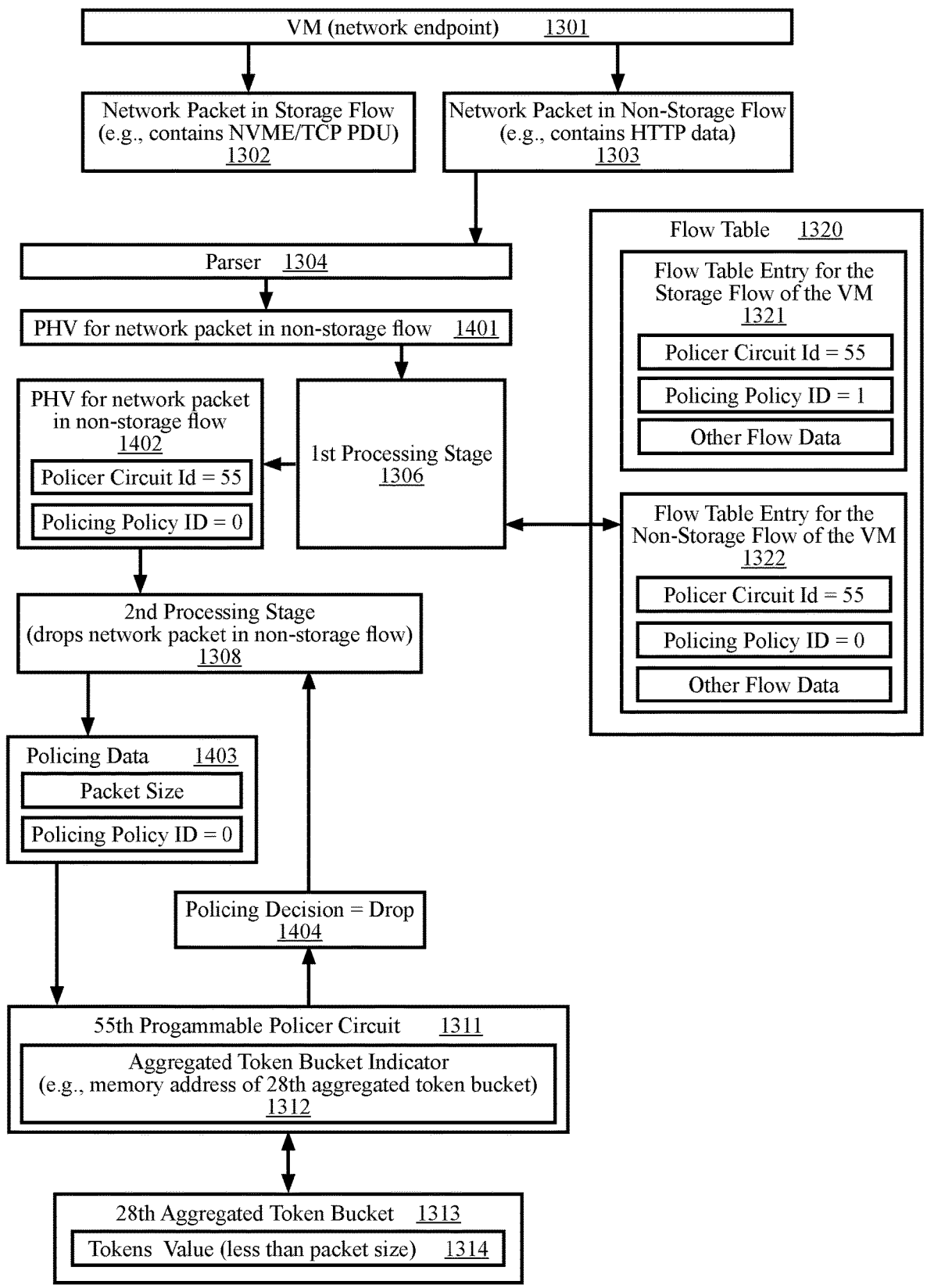
FIG. 14 is a high-level conceptual diagram illustrating an example of dropping a packet received from a network endpoint, according to some aspects.

FIG. 14 is a high-level conceptual diagram illustrating an example of dropping a packet received from a network endpoint 1301, according to some aspects. The network endpoint 1301 attempts to send a non-storage packet 1303. A non-storage packet is a network packet in a non-storage flow. The parser 1304 parses the non-storage packet 1303 to produce a PHV 1401. The first processing stage 1306 reads the flow table entry 1322 for the non-storage flow from the flow table 1320. In this example, the programmable policer identifier is 55 and the policing policy identifier is 0. The first processing stage adds the programmable policer identifier and the policing policy identifier to the PHV 1402. The second processing stage 1308 receives the PHV 1402 and sends policing data 1403 to the 55th programmable policer circuit 1311, which is the programmable policer circuit identified by the programmable policer identifier. The policing data 1309 includes the packet size (the resources required value) and the policing policy identifier. The 55th programmable policer circuit 1311 is associated with the 28th aggregated token bucket 1313. For example, the programmable policer circuits may contain (e.g., store in a register) an aggregated token bucket identifier. The aggregated token bucket identifier 1312 of the 55th programmable policer circuit 1311 may identify the 28th aggregated token bucket 1313. In this example, the tokens value 1314 in the 28th aggregated token bucket 1313 is less than the packet size. The 55th programmable policer circuit 1311 produces a "drop" policing decision 1404 when the policing policy identifier equals 0 and the resources required value is greater than the tokens value (assumes threshold equals 0). The second processing stage receives the policing decision and drops the non-storage packet 1303.

Figure 15:
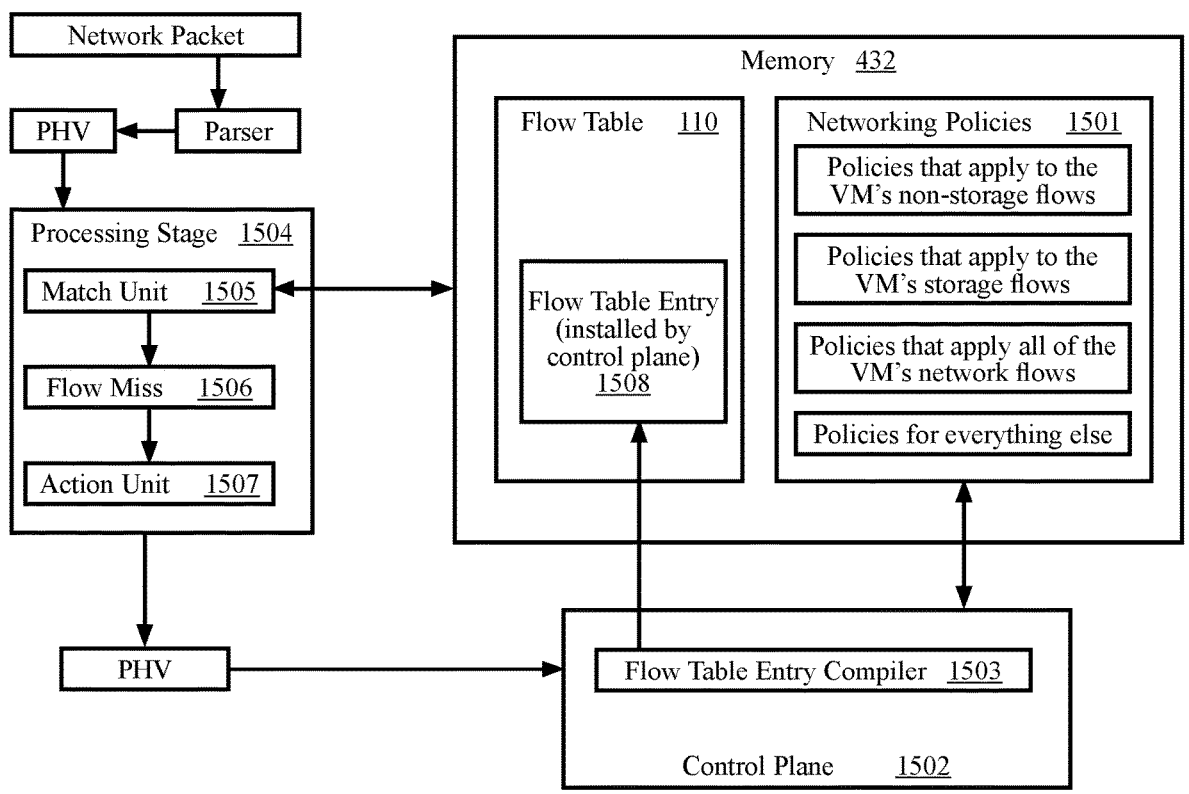
FIG. 15 is a high-level conceptual diagram illustrating a control plane using networking policies to produce flow table entries, according to some aspects.

FIG. 15 is a high-level conceptual diagram illustrating a control plane 1502 using networking policies 1501 to produce flow table entries, according to some aspects. The networking policies 1501 and a flow table 110 that includes flow table entries may be stored in a memory of a networking device. A network packet is received and parsed to produce a PHV. The match unit 1505 of a processing stage 1504 attempts to read a flow table entry for the network packet from the flow table 110. The match unit may produce a flow miss 1506 when the flow entry does not exist. The action unit 1507 may add a flow miss indicator to the PHV and send the PHV to the control plane 1502. A flow table entry compiler 1503 may produce flow table entries for the network packet by applying the networking policies to the PHV. The flow table entries thus produced may be specifically for processing the network packets of the network flow that includes the network packet that caused the flow miss. A flow table entry 1508 for the network flow may then be stored in the flow table. Other flow table entries may be stored in the flow tables that are used by other processing stages. The data plane, which includes the packet processing pipeline circuit, may be configured to process a network flow when the control plane stores the flow table entries for the network flow in the flow tables.

Figure 16:
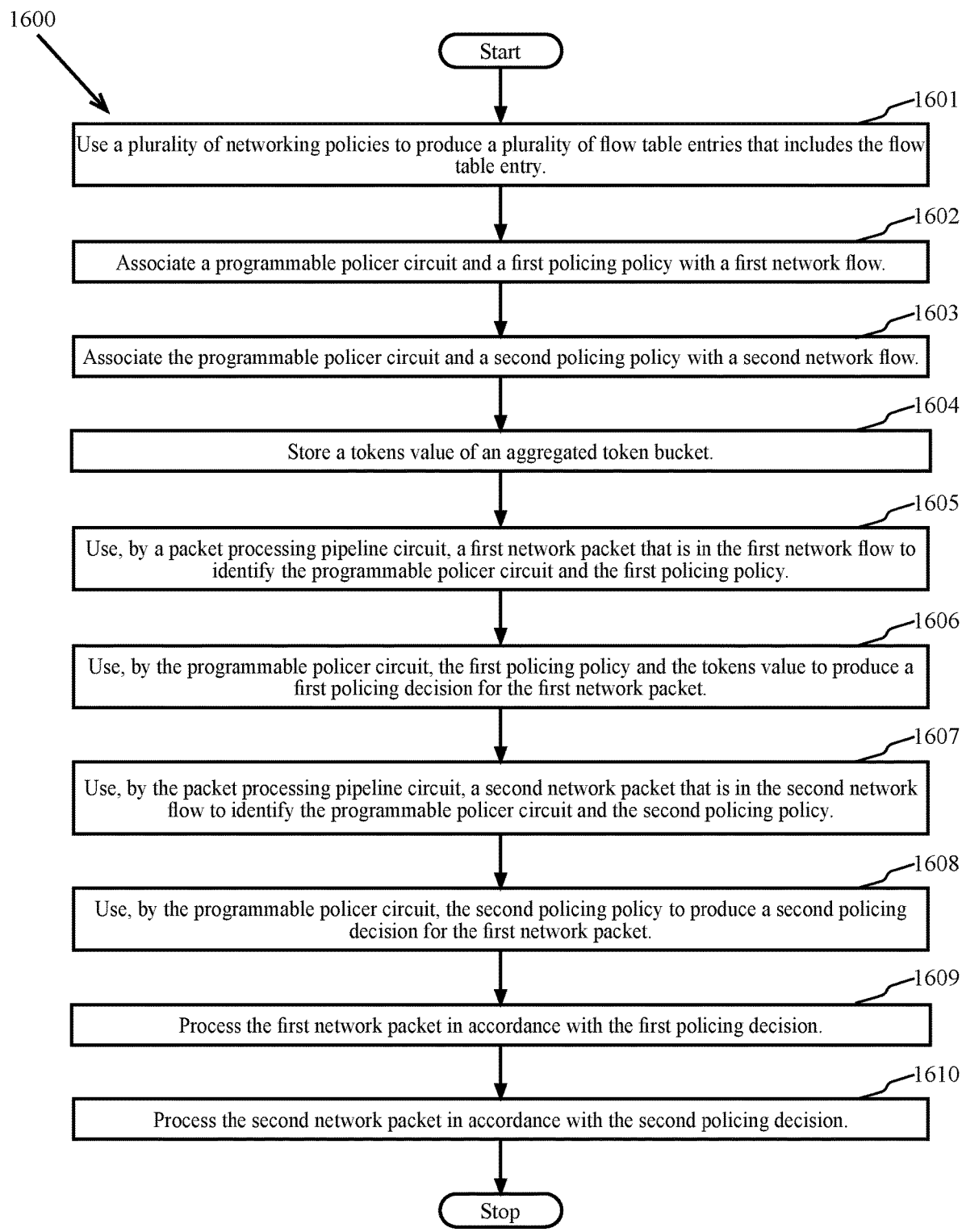
FIG. 16 is a high-level flow diagram illustrating a method for using programmable policer circuits to implement strict priority for a class of traffic, according to some aspects.

FIG. 16 is a high-level flow diagram illustrating a method 1600 for using programmable policer circuits to implement network flow policing, according to some aspects. At block 1601, the method may use a plurality of networking policies to produce a plurality of flow table entries that includes the flow table entry. At block 1602, the method may associate a programmable policer circuit and a first policing policy with a first network flow. For example, a flow table entry for the first network flow may be created that includes the policer circuit ID of the programmable policer circuit and the policing policy ID of the first policing policy. At block 1603, the method may associate the programmable policer circuit and a second policing policy with a second network flow. For example, a flow table entry for the second network flow may be created that includes the policer circuit ID of the programmable policer circuit and the policing policy ID of the second policing policy. At block 1604, the method may store a tokens value of an aggregated token bucket. At block 1605, a packet processing pipeline circuit, may use a first network packet that is in the first network flow to identify the programmable policer circuit and the first policing policy. At block 1606, the programmable policer circuit may use the first policing policy and the tokens value to produce a first policing decision for the first network packet. At block 1607, the packet processing pipeline circuit may use a second network packet that is in the second network flow to identify the programmable policer circuit and the second policing policy. At block 1608, the programmable policer circuit may use the second policing policy to produce a second policing decision for the first network packet. At block 1609, the method may process the first network packet in accordance with the first policing decision. At block 1610, the method may process the second network packet in accordance with the second policing decision. A packet may be processed in accordance with a policing decision by implementing the policing decision while processing the packet. For example, a packet may be processed in accordance with a "drop" policing decision by dropping the packet. A packet may be processed in accordance with an "allow" policing decision by not dropping the packet.

Figure 17:
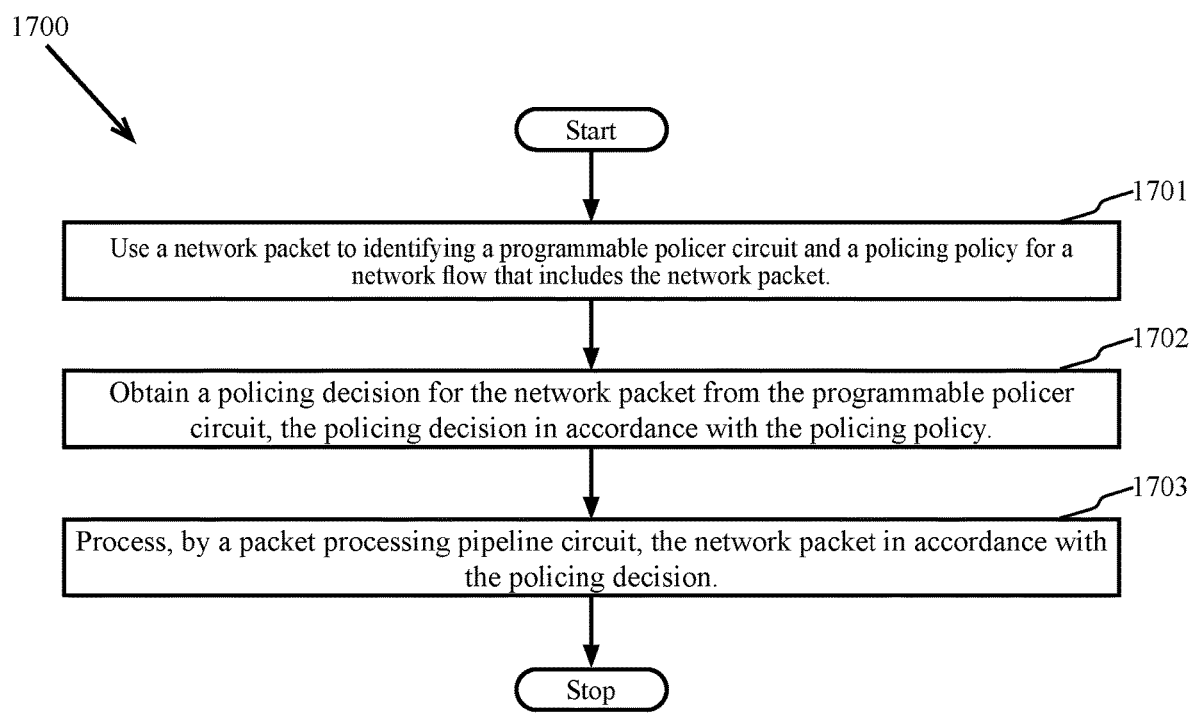
FIG. 17 is another high-level flow diagram illustrating a method for using programmable policer circuits to implement strict priority for a class of traffic, according to some aspects.

FIG. 17 is another high-level flow diagram illustrating a method 1700 for using programmable policer circuits to implement network flow policing, according to some aspects. At block 1701, the method may use a network packet to identify a programmable policer circuit and a policing policy for a network flow that includes the network packet. At block 1702, the method may obtain a policing decision for the network packet from the programmable policer circuit, the policing decision in accordance with the policing policy. At block 1703, a packet processing pipeline circuit may process the network packet in accordance with the policing decision.

Aspects described above may be ultimately implemented in a networking device that includes physical circuits that implement digital data processing, storage, and communications. The networking device may include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU and other semiconductor chip circuits are fabricated on the same semiconductor substrate to form a System-on-Chip (SoC). The networking device may be implemented as a single IC device (e.g., fabricated on a single substrate) or the networking device may be implemented as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

Figure 18:
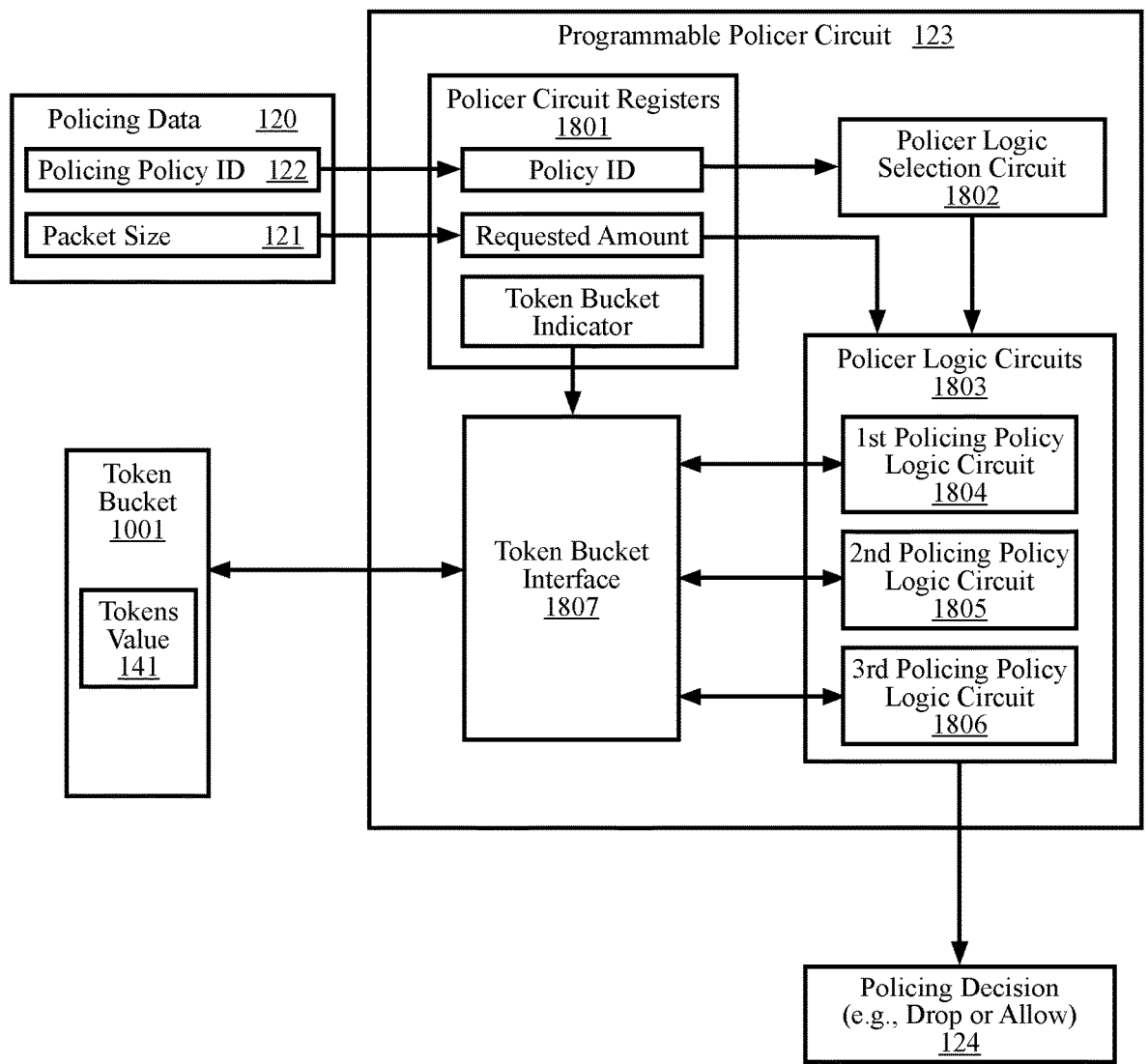
FIG. 18 is a high-level block diagram illustrating an example of a programmable policer circuit, according to some aspects.

FIG. 18 is a high-level block diagram illustrating an example of a programmable policer circuit 123, according to some aspects. The programmable policer circuit 123 may include policer circuit registers 1801, a policer logic selection circuit 1802, policer logic 1803, and a token bucket interface 1807. The policer circuit registers 1801 may include a policing policy identifier register, a requested amount register, and a token bucket indicator register. The policing policy identifier 122 in the policing data may be written into the policy identifier register. The packet size value 121 in the policing data 120 may be written into the requested amount register. A token bucket may be associated with the programmable policer circuit by writing a token bucket indicator into the token bucket ID register. The token bucket interface 1807 may use the token bucket indicator to access the token bucket 1001 to, for example, read and write the tokens value 141. The token buck indicator may be an index value (e.g., "33" to indicate the 33rd token bucket), an address, or any other value that identifies or indicates a token bucket. The control plane may write a value into the token bucket indicator register during initialization of the data plane. The flow table entry for a network flow may include a token bucket indicator that may be included in the policing data 120 and that may be written into the token bucket indicator register when the other values in the policing data 120 are written into the policer circuit registers. In such a scenario, a token bucket is associated with a network flow when the control plane configures the data plane to process network packets for the network flow. The token bucket 1001 is then associated with the programmable policer circuit 123 when the policing data 120 is written into the policer circuit registers 1801. A value may be hardwired into the token bucket indicator register such that a specific token bucket is always associated with a specific programmable policer circuit.

The policer logic circuits 1803 may produce policing decisions 124. The policer logic circuits 1803 may include a first policing policy logic circuit 1804, a second policing policy logic circuit 1805, and a third policing policy logic circuit 1806. The policer logic selection circuit 1802 may use the value in the policer policy identifier register to select one of the policer logic circuits 1803 to thereby select a policing policy. For example, the first policing policy logic circuit 1804 may produce a "drop" policing decision in response to determining that the tokens value 141 minus the requested amount is less than a threshold value. Otherwise, the first policing policy logic circuit 1804 may produce an "allow" policing decision and subtract the requested amount from the tokens value in response to determining that the tokens value 141 minus the requested amount is not less than a threshold value. The second policing policy logic circuit 1805 may always produce an "allow" policing decision and always subtract the requested amount from the tokens value. The third policing policy logic circuit 1806 may always produce an "allow" policing decision and not subtract the requested amount from the tokens value.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It may also be noted that at least some of the operations for the methods described herein may be implemented using software instructions stored on a computer usable storage medium for execution by a computer. For example, a computer program product may include a computer usable storage medium to store a computer readable program.

The computer-usable or computer-readable storage medium may be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific examples have been described and illustrated, the scope of the claimed systems, methods, devices, etc. is not to be limited to the specific forms or arrangements of parts so described and illustrated. The scope is to be defined by the claims appended hereto and their equivalents.

What is claimed is:

1. A system comprising:
a programmable policer circuit configured to use a token bucket and a policing policy to produce a policing decision for a network packet in a network flow associated with the policing policy;
a packet processing pipeline circuit configured to implement a data plane; and
a processor configured to implement a control plane;
wherein the programmable policer circuit, the packet processing pipeline circuit, and the processor are further configured to implement network flow policing that involves:
the control plane configuring the data plane to process the network packet; and
the control plane associating the network flow with the policing policy such that the data plane is configured to process the network packet in accordance with the policing decision.

2. The system of claim 1, wherein:
the packet processing pipeline circuit is configured to use the network packet to identify a flow table entry that includes a policing policy identifier identifying the policing policy and a policer identifier identifying the programmable policer circuit; and
the packet processing pipeline circuit uses the policer identifier to provide policing data to the programmable policer circuit, the policing data including the policing policy identifier.

3. The system of claim 2 wherein the control plane uses a plurality of networking policies to produce a plurality of flow table entries that includes the flow table entry.

4. The system of claim 2, wherein:
the packet processing pipeline circuit includes a parser stage and a plurality of match-action processing stages;
the parser stage produces a packet header vector (PHV) from the network packet; and
one of the match-action processing stages uses the PHV to identify the flow table entry.

5. The system of claim 1, wherein:
the token bucket is an aggregated token bucket;
the programmable policer circuit is configured to use the aggregated token bucket and a second policing policy to produce a second policing decision for a second network packet in a second network flow associated with the second policing policy; and
the packet processing pipeline circuit is configured to process the second network packet in accordance with the second policing decision.

6. The system of claim 5 wherein the network flow is directed to or from a network endpoint and the second network flow is directed to or from the network endpoint.

7. The system of claim 6 wherein the network endpoint is a virtual machine.

8. The system of claim 5 wherein:
the policing decision is to drop the network packet in response to determining that allowing the network packet would cause a tokens value of the aggregated token bucket to be less than a threshold value; and
the second policing decision is to allow the second network packet even though the tokens value is below the threshold value.

9. The system of claim 8 wherein:
the network flow is a non-storage flow; and
the second network flow is a storage flow.

10. The system of claim 5 wherein:
the policing decision is to drop the network packet in response to determining that allowing the network packet would cause a tokens value of the aggregated token bucket to be less than a threshold value; and
the second policing policy is to always allow and to always decrease the tokens value based on a size of an allowed network packet.

11. A method comprising:
using a network packet to identify a programmable policer circuit and a policing policy for a network flow that includes the network packet;
obtaining a policing decision for the network packet from the programmable policer circuit, the policing decision in accordance with the policing policy; and
processing, by a packet processing pipeline circuit, the network packet in accordance with the policing decision.

12. The method of claim 11, wherein:
a flow table includes a flow table entry that is associated with first network flow,
the packet processing pipeline circuit uses the network packet to identify the flow table entry;
the flow table entry includes a policing policy identifier that identifies the policing policy and includes a policer identifier that identifies the programmable policer circuit; and
the packet processing pipeline circuit uses the policer identifier and the policing policy identifier to obtain the policing decision from the programmable policer circuit.

13. The method of claim 12 further including using a plurality of networking policies to produce a plurality of flow table entries that includes the flow table entry.

14. The method of claim 12, wherein:
the packet processing pipeline circuit includes a parser stage and a plurality of match-action processing stages;
the parser stage produces a packet header vector (PHV) from the network packet; and
one of the match-action processing stages uses the PHV to identify the flow table entry.

15. The method of claim 11, further including:
using a tokens value in an aggregated token bucket for policing the network flow and a second network flow that is associated with a second policing policy;
using, by the programmable policer circuit, the aggregated token bucket and the second policing policy to produce a second policing decision for a second network packet that is in the second network flow; and
processing, by the packet processing pipeline circuit, the second network packet in accordance with the second policing decision.

16. The method of claim 15, wherein:
the policing decision is to drop the network packet in response to determining that allowing the network packet would cause the tokens value to be less than a threshold value; and
the second policing decision is to allow the second network packet even though the tokens value is below the threshold value.

17. The method of claim 15 wherein:
the network flow is a non-storage flow for a virtual machine; and
the second network flow is a storage flow for the virtual machine.

18. The method of claim 15 wherein:

the policing decision is to drop the network packet in response to determining that allowing the network packet would cause the tokens value to be less than a threshold value; and the second policing policy is to always allow and to always decrease the tokens value based on a size of an allowed network packet.

19. A system comprising:

a programmable policing means for producing a policing decision for a network packet in accordance with a tokens value and a policing policy for a network flow; and a packet processing means for processing the network packet in accordance with the policing decision, wherein:

the programmable policing means produces a second policing decision for a second network packet in accordance with the tokens value and a second policing policy for a second network flow; and the packet processing means processes the second network packet in accordance with the second policing decision.

20. The system of claim 19, further including:

a lookup means for using the network packet to identify the programmable policing means and the policing policy, wherein the lookup means uses the second network packet to identify the programmable policing means and the second policing policy.

* * * * *